United States Patent
Mantravadi et al.

[11] Patent Number: 5,206,499
[45] Date of Patent: Apr. 27, 1993

[54] STRAPDOWN STELLAR SENSOR AND HOLOGRAPHIC MULTIPLE FIELD OF VIEW TELESCOPE THEREFOR

[75] Inventors: Murty V. Mantravadi, Carson; Susan M. Raffensperger, Long Beach; Phillip Simpson, Rancho Palos Verdes; Douglas R. Jungwirth, Reseda; Seymour Levine, Topanga, all of Calif.

[73] Assignee: Northrop Corporation, Los Angeles, Calif.

[21] Appl. No.: 811,566

[22] Filed: Dec. 20, 1991

Related U.S. Application Data

[60] Continuation-in-part of Ser. No. 688,190, Apr. 19, 1991, abandoned, which is a division of Ser. No. 369,790, Jun. 22, 1989, Pat. No. 5,012,081.

[51] Int. Cl.⁵ .................................................. G01J 1/20
[52] U.S. Cl. ................................ 250/203.6; 250/216; 359/20; 359/399
[58] Field of Search ............... 250/203.1, 203.6, 216; 244/3.16; 359/19, 20, 399

[56] References Cited

U.S. PATENT DOCUMENTS

| | | |
|---|---|---|
| 3,263,088 | 7/1966 | Goldfischer . |
| 3,915,548 | 10/1975 | Opittek et al. . |
| 3,940,203 | 2/1976 | La Russa . |
| 3,949,490 | 4/1976 | Derderian et al. . |
| 4,072,395 | 2/1978 | Mohon . |
| 4,181,435 | 1/1980 | Williamson et al. . |
| 4,184,749 | 1/1980 | Grossman . |
| 4,185,919 | 1/1980 | Williamson et al. . |
| 4,189,116 | 2/1980 | Ehrich et al. . |
| 4,245,882 | 6/1981 | Chang . |
| 4,330,705 | 5/1982 | Kollodge . |
| 4,490,981 | 1/1985 | Meckler . |
| 4,550,973 | 11/1985 | Hufnagel ........................ 359/19 |
| 4,641,934 | 2/1987 | Freeman . |
| 4,662,730 | 5/1987 | Outwater et al. . |
| 4,669,812 | 6/1987 | Hoebing ........................ 359/20 |
| 4,687,282 | 8/1987 | Ferrante . |
| 4,701,005 | 10/1987 | Noguchi . |
| 4,730,912 | 3/1988 | Loy et al. . |
| 4,740,681 | 4/1988 | Tsuno . |
| 4,957,336 | 9/1990 | Hasegawa et al. . |
| 5,012,081 | 4/1991 | Jungwirth et al. . |

*Primary Examiner*—David C. Nelms
*Attorney, Agent, or Firm*—Terry J. Anderson; Robert B. Block; Karl J. Hoch

[57] ABSTRACT

A star tracker for generating positional information for a vehicle includes a holographic telescope (150) having one or more fields of view for imaging stellar objects. The telescope includes a plurality of radiation detectors (100) and an input aperture comprised of a primary holographic optical element (HOE) (134). The primary HOE provides one or more wavefronts to one or more secondary HOEs (136), each of which applies a chromatic correction so as to correct for a chromatic aberration induced by the primary HOE. A single or multiple field of view Schmidt telescope embodiment is also disclosed having one or more aspheric corrector plate HOEs and one or more associated concave spherical reflectors.

21 Claims, 12 Drawing Sheets

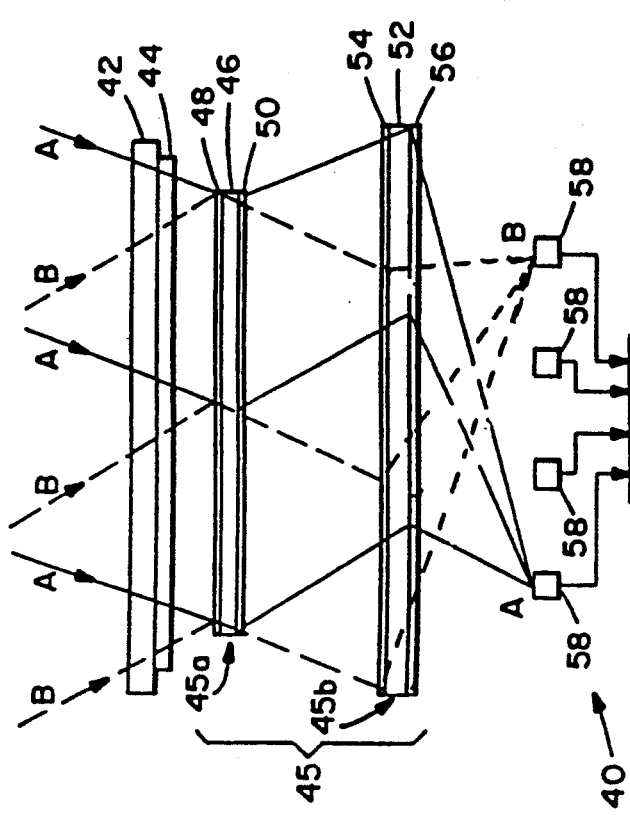
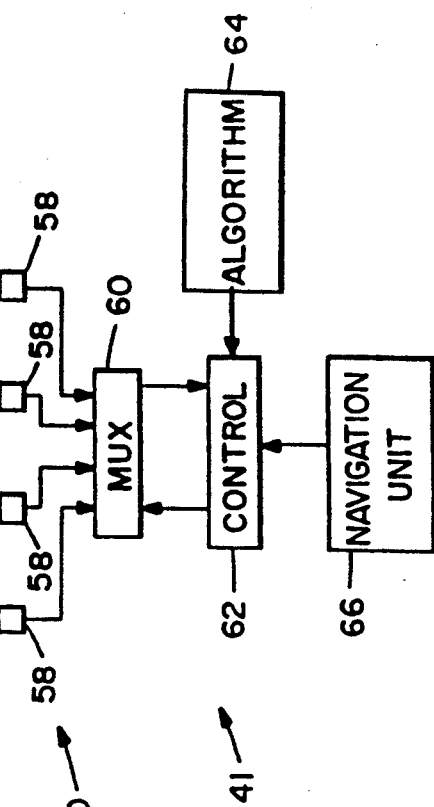
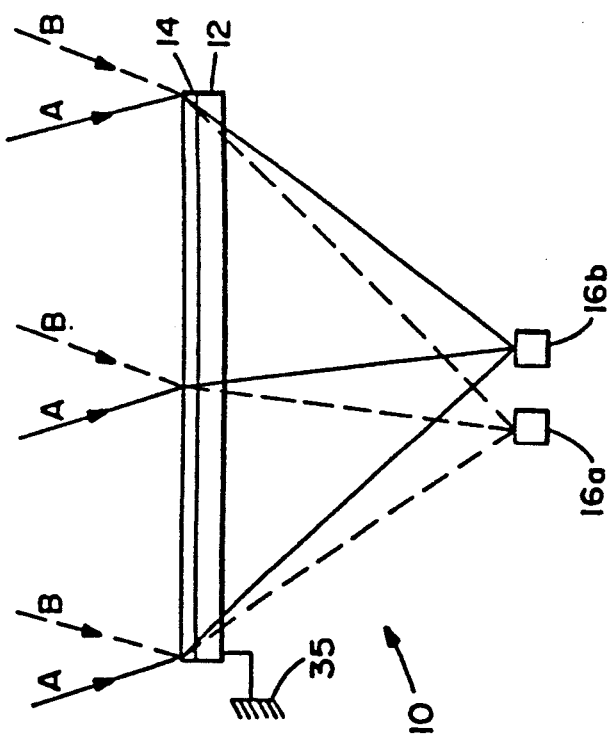
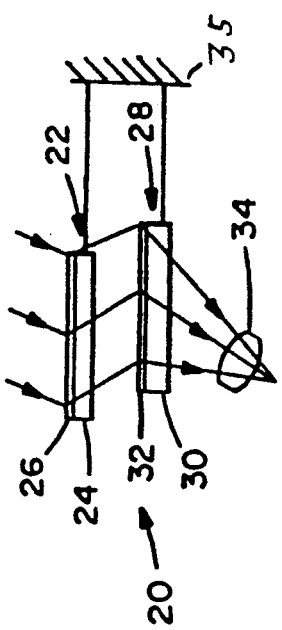

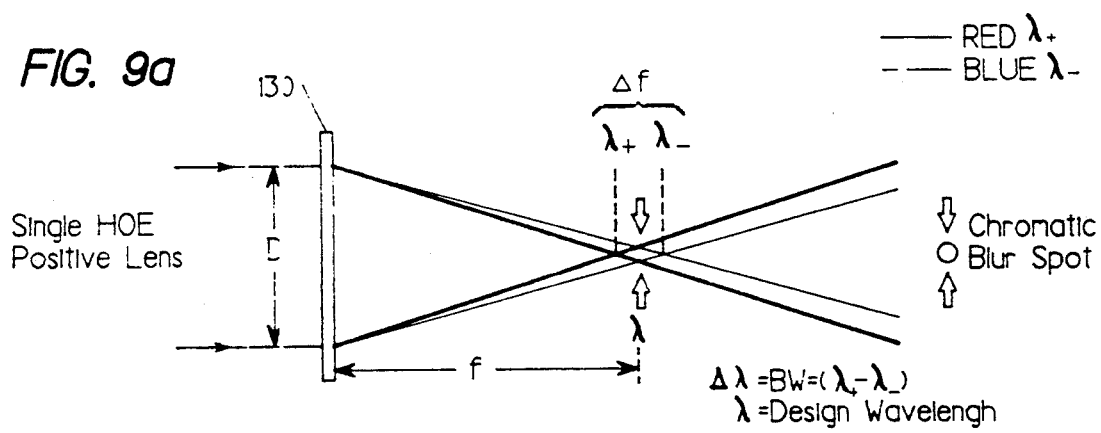
FIG. 9a Single HOE Positive Lens
$\Delta\lambda = BW = (\lambda_+ - \lambda_-)$
$\lambda$ = Design Wavelength
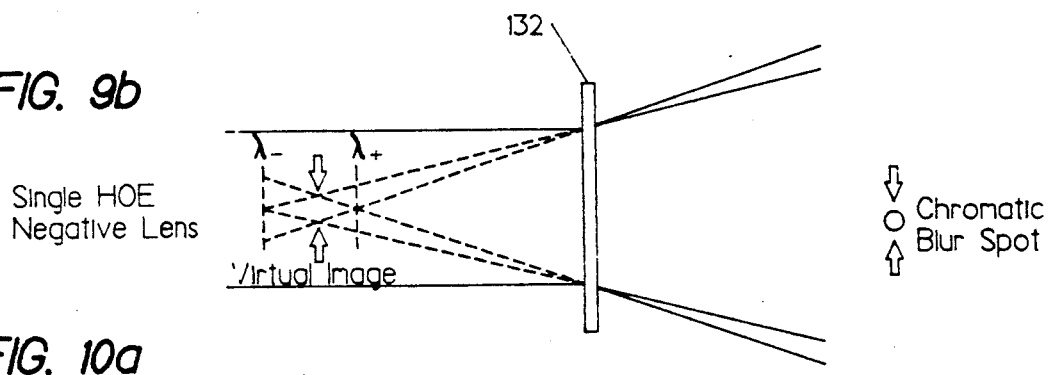
FIG. 9b Single HOE Negative Lens
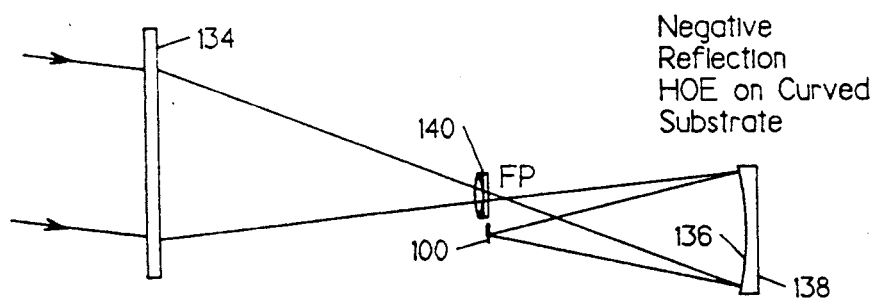
FIG. 10a Negative Reflection HOE on Curved Substrate
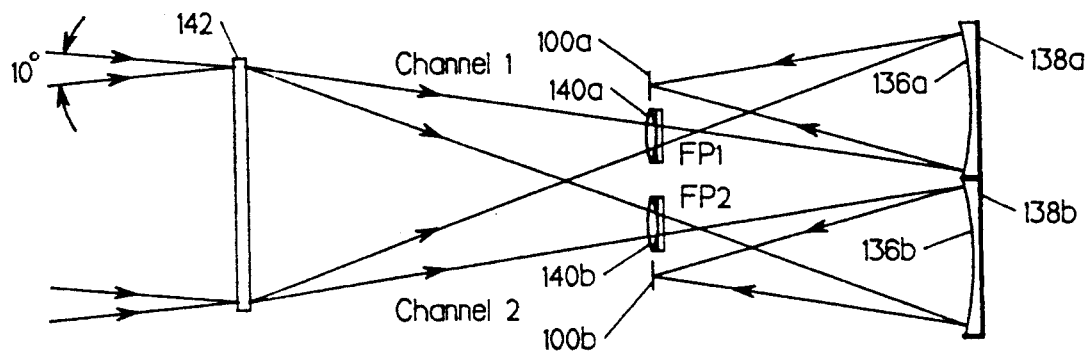
FIG. 10b

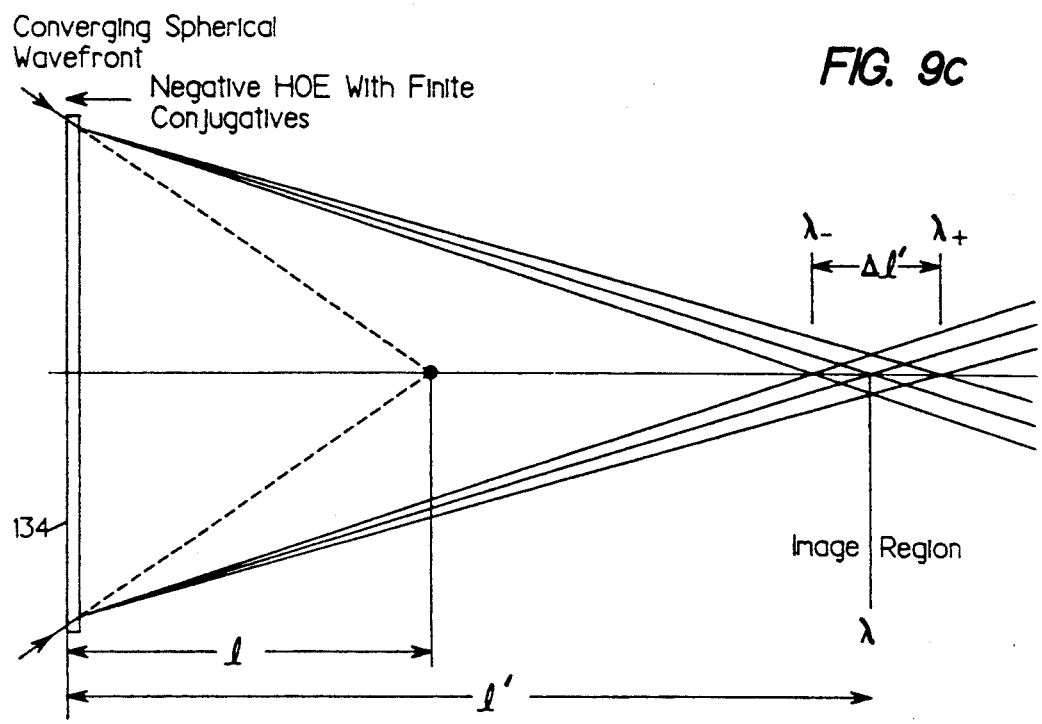
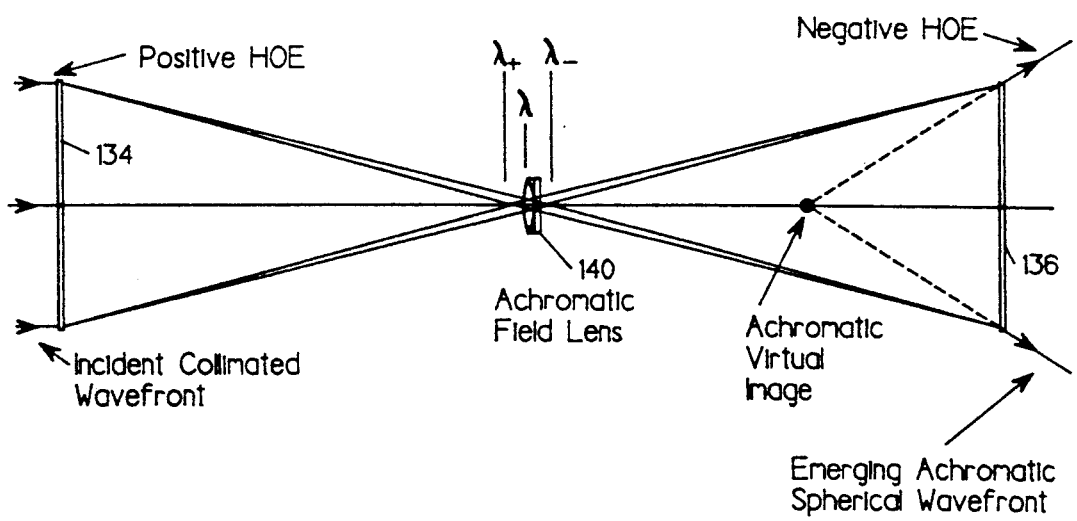

STRAPDOWN STELLAR SENSOR AND HOLOGRAPHIC MULTIPLE FIELD OF VIEW TELESCOPE THEREFOR

This patent application is a continuation-in-part of commonly assigned U.S. patent application Ser. No. 07/688,190, filed Apr. 19, 1991, now abandoned, "Strapdown Stellar Star Sensor and Holographic Lens Therefor", by D.R. Jungwirth et al., which is a division of commonly assigned U.S. patent application Ser. No. 07/369,790, filed Jun. 22, 1989, "Strapdown Stellar Star Sensor and Holographic Lens Therefor", by D.R. Jungwirth et al., now U.S. Pat. No. 5,012,081, issued Apr. 30, 1991.

FIELD OF THE INVENTION

This invention relates generally to stellar object sensors, including telescopes, and, in particular, relates to a multiple field of view strapdown star tracker having a wide angle input lens.

By a strapdown star tracker is meant an inertial navigator without gimbals that is directly attached, i.e., strapped-down, to a vehicle frame.

The invention also relates to a new class of holographic lenses which find as one application a use in the disclosed strapdown star tracker.

BACKGROUND OF THE INVENTION

The alignment of an inertial navigation system is essential for accurate performance. Normally, several different alignment modes are available to the system operator depending on the amount of time that is available before navigation must begin. For a system carried by an aircraft a typical set of gimballed inertial system alignment modes may include a single position ground alignment, a two position (gyrocompass) ground alignment, and an extended ground alignment involving multiple platform orientations with respect to local gravity and the earth rate vector. A two position alignment can provide adequate performance as it allows calibration of both level gyro biases.

However, for strapdown inertial navigation systems alignment accuracy is more difficult to achieve. The heading can be determined only to the accuracy of the effective east/west component of level gyro bias or, conversely, the effective east/west gyro bias can ascertained only to the accuracy allowed by the input heading. In addition, inertial attitude errors have a much more severe impact on strapdown inertial navigation system performance than for gimballed systems as total vehicle body rates drive cross axis tilt errors and misalignment sensitivities. It is therefore of great benefit for strapdown inertial navigation systems to employ additional measurements to compensate for their inherent lack of calibration flexibility.

As can be seen in FIG. 6 star tracker 1 is a particularly useful calibration aid for augmenting a strapdown inertial system 2 in that the star tracker 1 accurately observes system alignment errors, including strapdown inertial navigation system maneuver-induced errors. A star tracker and filter combination provides gyro drift and scale factor corrections, accelerometer bias corrections, tilt corrections, velocity corrections and position corrections to the strapdown Inertial Measurement Unit (IMU) 2. Furthermore, the star tracker 1 is self-contained, need not increase an aircraft's signature, and is not susceptible to hostile jamming.

Some conventional star trackers have a telescope that images one region of the sky at any given time. In order to view a plurality of stellar objects it is necessary to reposition the telescope. One technique repositions the telescope or the telescope's field of view (FOV) relative to the frame of the vehicle. However, this technique requires precision pointing apparatus, such as a gimballed platform, that adds to the cost and complexity of the star tracker and furthermore may in itself introduce a positional error. Such a positionable telescope is not considered to be a strapdown star tracker system.

The telescope may also be repositioned by movement of the vehicle itself. By example, the telescope may be fixed, or strapped down, to the frame of a satellite while the orbital and/or spin rate of the satellite is used to acquire different stars. While suitable for use in some types of satellite and missile applications this latter technique is generally not applicable to aircraft, especially high velocity aircraft, operated within the atmosphere.

Strapdown star trackers are also known that employ a plurality of smaller telescopes each pointing at a different area of the sky. A disadvantage of this type of system is that the effective entrance aperture, for a given size and weight of the star tracker, is divided among the plurality of telescopes. Thus, each of the plurality of telescope entrance apertures is smaller than that of a single telescope of equivalent aperture and, therefore, the light gathering capability and sensitivity of the system is compromised.

It is thus one object of the invention to provide a strapdown star tracker having a telescope that simultaneously views a plurality of regions of the sky.

It is another object of the invention to provide a strapdown star tracker having a telescope that employs a multiple field of view holographic lens as an input lens.

It is another object of the invention to provide a strapdown star tracker having a telescope that employs a single or a multiple field of view positive holographic optical element at an input aperture and that corrects for a chromatic aberration induced by the positive holographic optical element with one or more negative holographic elements.

SUMMARY OF THE INVENTION

The foregoing problems are overcome and the objects of the invention are realized by a star tracker for generating angular information for a vehicle which, in accordance with the invention, includes a holographic telescope having multiple fields of view for imaging stellar objects and other heavenly bodies, including the sun and planets.

A star tracker for generating positional information for a vehicle includes a holographic telescope having multiple fields of view for simultaneously imaging a plurality of stellar objects and other heavenly bodies. The telescope includes a plurality of radiation detectors and one or more input apertures each of which is defined by a radiation receiving surface of a primary holographic optical element (HOE) having a positive power. The primary HOE focuses one or more wavefronts which are subsequently applied to one or more secondary HOEs, each having a negative power. Each of the secondary HOEs applies a chromatic correction so as to correct for a chromatic aberration induced by the primary HOE. In one embodiment of the invention each of the secondary HOEs has a concave reflecting surface for providing at a focal point thereof a chromatically corrected image of a stellar object. An achromatic field lens is interposed at each focal point of the primary HOE and operates to bring light rays diverging from a single point on the primary HOE to a single point on the associated secondary HOE so that a same amount of chromatic correction is added to each ray.

On-axis, symmetrical embodiments and off-axis, non-symmetrical embodiments of the invention are described, as are embodiments wherein the primary HOE has one focussing element or has a plurality of focussing elements recorded therein.

Also disclosed is a Schmidt telescope embodiment of the invention having a concave spherical mirror and a corrector plate positioned at a center of curvature of the spherical mirror. The corrector plate includes a holographic optical element for correcting for a spherical aberration of the spherical mirror. A radiation detector is positioned at a focal plane of the concave spherical mirror. At least one fold mirror may also be positioned between the concave spherical mirror and the corrector plate. In a further embodiment a plurality of concave spherical mirrors are employed with a multiple field of view holographic corrector plate, the corrector plate having a plurality of holograms recorded therein for correcting for the spherical aberration of each of the spherical mirrors.

BRIEF DESCRIPTION OF THE DRAWING

The above set forth and other features of the invention will be made more apparent in the ensuing Detailed Description of the Invention when read in conjunction with the attached Drawing, wherein:

FIG. 1 shows in cross-section a volume hologram disposed on a transparent substrate for directing a plurality of input beams to a plurality of detectors;

FIG. 2 shows two volume holograms in a series arrangement that provides aberration correction and high diffraction efficiency and optical power for a input optical beam;

FIG. 3 shows an embodiment of the invention wherein a star tracker has a telescope which includes a holographic optical input lens element;

FIG. 9a illustrates a positive holographic element (HOE) having a chromatic aberration that causes red light to be focussed at a different point than blue light;

FIG. 9b illustrates a negative HOE also having a chromatic aberration that causes red light to be focussed at a different point than blue light;

FIG. 9c depicts the operation of a negative HOE with finite conjugates for a converging spherical wavefront;

FIG. 9d illustrates a positive HOE, a negative HOE, and an achromatic field lens interposed therebetween;

FIG. 10a illustrates a non-centrally symmetric embodiment of a holographic telescope;

FIG. 10b illustrates a further embodiment of a non-centrally symmetric holographic telescope having a plurality of fields of view;

DETAILED DESCRIPTION OF THE INVENTION

Figure 4A:
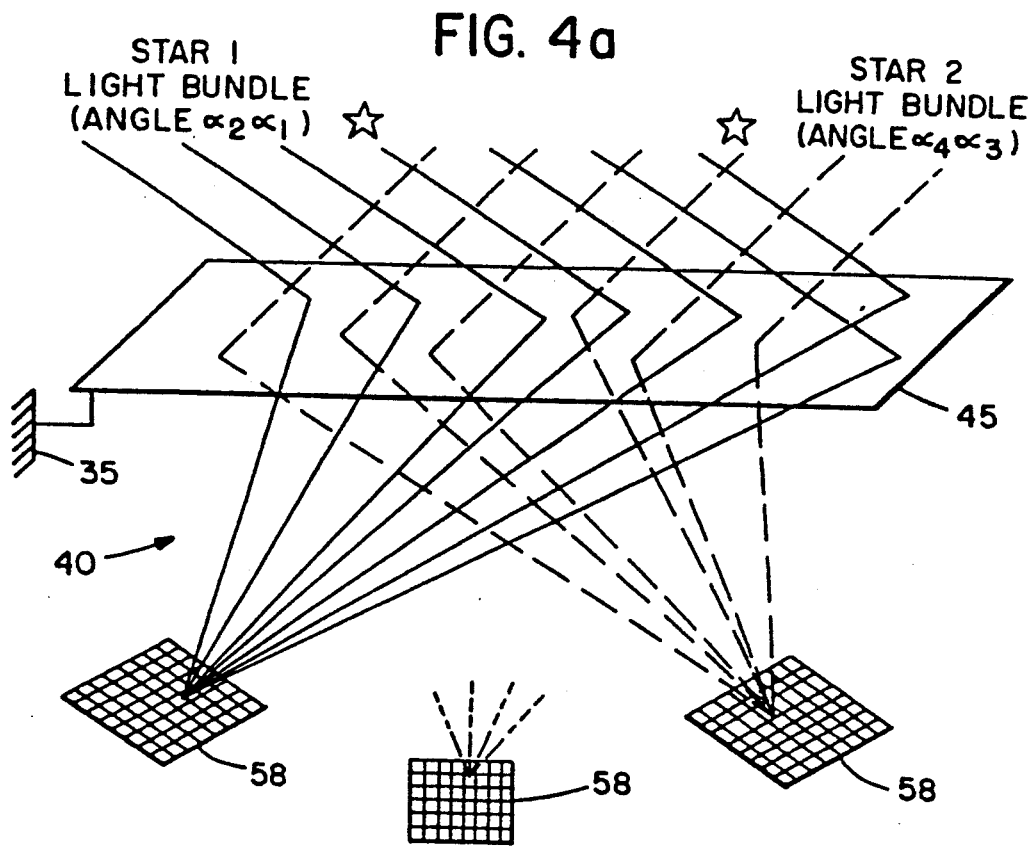
FIG. 4a shows a simplified view of the embodiment of FIG. 3 wherein light is directed to a plurality of multi-element detectors.

Referring to FIG. 1 there is shown in cross-section a holographic lens 10 comprised of a substrate 12 which is transparent at lens operating wavelengths and having a volume hologram 14 disposed on a surface thereof. The volume hologram 14 is fabricated by known methodology to contain, by example, two holograms within the same volume thereby allowing, in accordance with the invention, simultaneous viewing of two separated areas of the sky. Two incident beams (A,B) comprise different wavelengths of radiation if so desired. The volume hologram 14 can be comprised of, for example, a dichromated gelatin, silver halide, or a photopolymer; a method of fabricating such volume holograms being known in the art. The two input beams are shown being focussed upon two detectors 16a and 16b. In practice, detectors 16a and 16b each comprise multi-element solid state array detectors such as Charge Coupled Device (CCD) or Charge Injection Device (CID) type detectors. Although two such detectors are shown in FIG. 1, each receiving one of the beams, it can be realized that a single detector array can be provided with the input beams each being focussed upon a different region of the array. Alternatively, and as is shown in FIG. 4b, the two beams may be multiplexed onto but a single radiation detector. For certain applications, since the stars are widely dispersed, it may be advantageous to directly focus different areas of the sky concurrently on one detector. The processor (110 of FIG. 8) has sufficient information to separate the star images. In practice, for a strapdown star tracker application the angular separation between the two beams is approximately 50° in order to provide the required positional accuracy for calibrating an inertial navigator and the viewing lenses and holograms disclosed for use in the present application are so constructed.

Several volume holograms, as shown in FIG. 1, can be stacked one on top of another with each maintaining an independent functionality so long as there is sufficient angular separation between each incoming beam of radiation. In that the thickness of the hologram determines the collection angle, a beam having an angle of incidence beyond the collection angle is unaffected. Thus, star radiation being directed to a particular detector is not adversely affected by passage through an adjacent volume hologram so long as the adjacent hologram has a different collection angle. Radiation outside of the collection angle passes through the hologram as though it were a simple piece of glass.

Referring to FIG. 2 it can be seen that several holograms can be disposed in a series arrangement to provide aberration correction, high diffraction efficiency, and optical power for an optical beam. The optical system 20 shown in FIG. 2 includes a first element 22 comprised of a substrate 24 and a volume hologram 26 and also includes a second element 28 comprised of a substrate 30 and a volume hologram 32. As can be seen, the element 22 has no optical power whereas the element 28 has power and focuses the input beam. In addition, just prior to focus, conventional refractive element 34, by known methodology, can also be added to further minimize aberration. The addition of the multiple holograms and/or refractive elements provide for a focus over a wide band of wavelengths.

In accordance with the present invention the holographic lens or other viewing means to be described, is affixed to the vehicle body 35 as by being mounted in a fixed position at a viewing window placed on the top of the vehicle.

Such a two-element optical system can further be employed to implement an input lens of a telescope, as is described below.

Referring now to FIG. 3 there is shown a multiple field of view telescope 40 constructed in accordance with the invention and forming a portion of one embodiment of a strapdown star tracker 41. Telescope 40 is mounted behind a window 42 which is typically attached to a vehicle that conveys the telescope 40. Optically coupled to the window 42 is a filter 44 that serves to filter out wavelengths other than the wavelengths of interest in order to minimize background light, lens aberrations and heating of the detector. The filter may be attached to or be an integral part of, any of the optical elements. An input lens 45 of the telescope 40 includes a first holographic lens 45a and a second holographic lens 45b. Lens 45a includes a transparent substrate 46, the substrate 46 having on a first, top surface a first volume hologram 48 and on a second, bottom surface a second volume hologram 50. Volume holograms 48 and 50 may each comprise two or more holographic elements disposed within a film comprised of, by example, a dichromated gelatin, silver halide, photopolymer or other photo-sensitive emulsion.

Mounted in serial arrangement with the lens 45a is the lens 45b which includes a transparent substrate 52 having a third volume hologram 54 on a top surface thereof and a fourth volume hologram 56 on a bottom surface thereof. The separation of lens 45a and lens 45b is exaggerated in FIG. 3 for clarity. In reality, the lenses could be very closely spaced, or in contact.

It should be noted that the two holographic lenses 45a and 45b of the telescope 40 of FIG. 3 are similar to those shown in FIG. 2 wherein the lenses act to focus the beam and provide aberration corrections. In cases where there is an object that is illuminated by a monochromatic light source (such as a laser beam), then a single holographic lens element, as illustrated in FIG. 1, can focus the beam.

The second holographic lens 45b focuses each of the ray bundles upon an associated detector 58, each associated detector 58 typically including a CCD array. Although four CCD detectors 58 are shown in FIG. 3 it should be realized that more or less than this number can be employed. Furthermore, to simplify the drawing only two beams A and B are shown in FIG. 3 although more than this number are readily viewed by the telescope 40 of the invention. Each of the detectors 58 is coupled to an electrical multiplexer 60 which sequentially reads out CCD detector signals on command from a control device, such as a computer 62. Computer 62, in accordance with an appropriate data reduction algorithm 64, operates to control the multiplexer 60 to read the array data, determine star locations, calculate star related centroid data and thereafter transmit position data to a navigation unit 66. The navigation unit 66 includes gyroscopes, such as ring laser gyroscopes (RLGs) or fiber optic gyroscopes (FOGs), accelerometers and associated control mechanisms. Star position updates are provided from the data reduction algorithm 64 to update the navigation unit 66 position or tilt. Thus, the computer 62 receives updated projected position information for use in guiding the vehicle.

It can be seen that the telescope 40 functions as a plurality of telescopes having a common large aperture in that it is provided with multiple fields of view by the input holographic optical lens element. Different sources viewed by the telescope 40 can be separated by angles in excess of 90°, the individual fields of view being determined by the effective focal lengths and the size of the detector array. The image quality is near diffraction limited with the entire clear aperture being used for all sources such that excellent collection efficiencies are achieved. The individual CCD array detectors 58 are typically rapidly scanned by the multiplexer 60 such that the individual fields of view are also scanned in a relatively rapid manner. Of course, if desired, each of the detectors 58 could be provided with a separate control means 62 for achieving substantially parallel operation with other of the detectors 58.

Figure 4B:
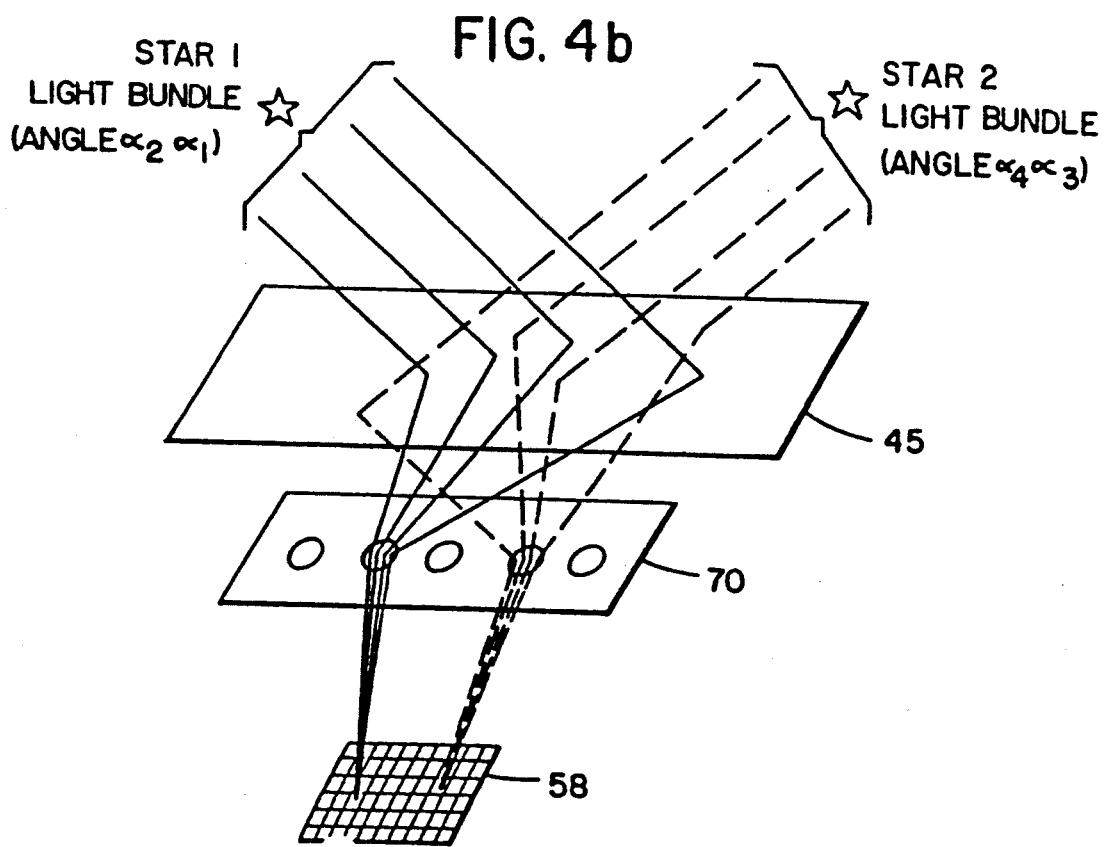
FIG. 4b shows a simplified view of a variation of the embodiment of FIG. 3 where light is directed to a single multi-element detector.

FIG. 4a shows a simplified view of telescope 40 of FIG. 3 wherein it can be seen that the lens 45 focuses light bundles from a plurality of stars onto a plurality of multi-element detectors 58. Each detector 58 may be an array comprised of, by example, 1024×1024 or more discrete detector elements.

FIG. 4b shows an alternate embodiment of the telescope 40 wherein an optical multiplexer, such as a shutter selection matrix 70, is disposed at focal points of the holographic lens 45. The matrix 70 is electronically actuable, such as by computer 62, to selectively pass the focussed light bundles to a single multi-element detector array 58. This embodiment eliminates the requirement for multiple CCDs.

The wide angle, full aperture star tracker holographic telescope 40 described above has a finite, although possibly very large, number of input beam axes that pass through a common full aperture. In accordance with another embodiment of the invention there is now described another wide angle, full aperture star tracker having a wide angle lens, preferably a Baker monocentric ball lens, that has an infinite number of input beam axes.

Figure 5A:
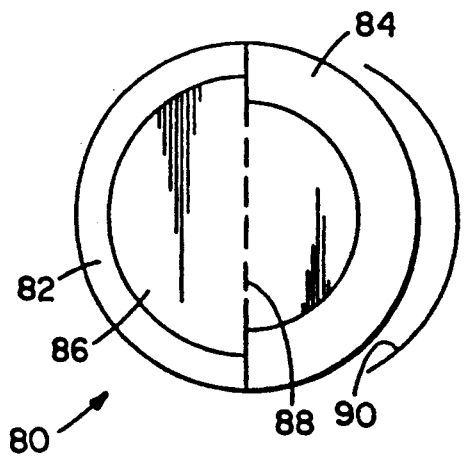
FIG. 5a shows a simplified cross-sectional view of a monocentric ball lens.
Figure 5B:
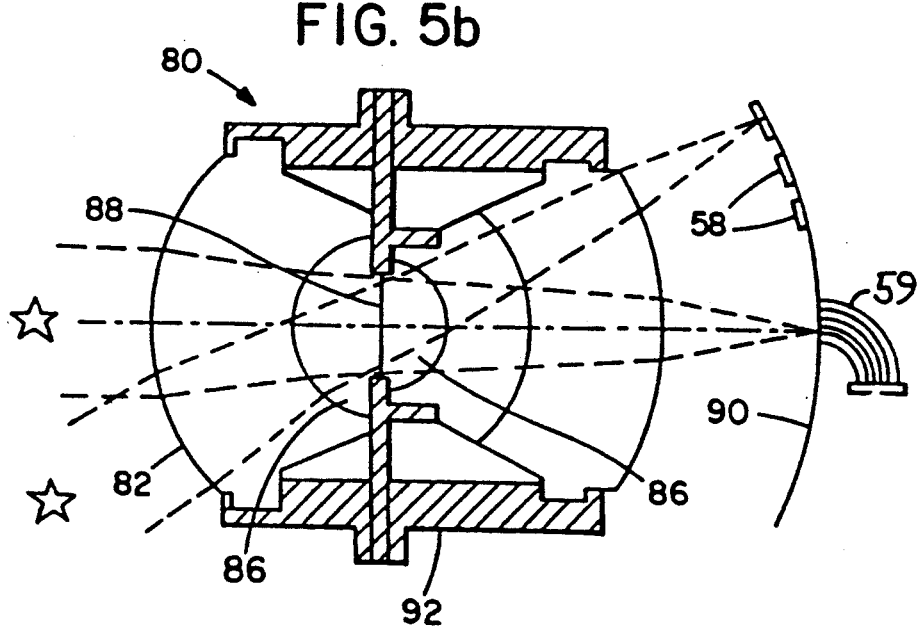
FIG. 5b shows in greater detail a cross-sectional view of a monocentric ball lens disposed adjacent to a focal plane for focussing incident radiation thereon.

For a strapdown star tracker application, the monocentric ball lens 80 illustrated in FIGS. 5a and 5b has unique advantages over other types of lenses. The monocentric ball lens 80 includes an entrance curved lens 82 and an exit curved lens 84. Lenses 82 and 84 are comprised of high index of refraction glass. An interior lens 86 is comprised of low index of refraction glass. Since all surfaces have the same center of curvature and there is no unique optical axis, every principal ray passing through the lens 80 defines its own optical axis. Thus, there are in theory no off-axis aberrations or distortions. In practice, an aperture stop 88 is placed at the center of curvature and some off-axis aberrations are introduced whenever the principal ray makes a finite angle with the normal to the field stop. In addition, because the surfaces are all concentric and the aperture stop 88 is at the common center, the rate of illumination falloff is proportional to the cosine between the field angle and the normal to the field stop. For most other lenses, the rate of illumination falloff is proportional to the fourth power of the cosine. Thus, the monocentric ball lens 80 has a much larger field of view for any given light dropoff. The above properties of the monocentric ball lens give it an exceptionally wide FOV (more than 60°) with a minimal aberration and image distortion. These properties make the monocentric ball lens 80 especially suitable for use in the wide angle star tracker optical system of the invention.

As can be seen in greater detail in FIG. 5b the lens 80 is constructed of a plurality of glass elements having high and low indices of refraction as indicated. A curved focal plane 90 is provided whereon the incident star light bundles are focussed. Focal plane 90 typically is covered or tiled with a plurality of focal plane array detectors 58. Alternatively, fiber optic bundles 59 can be provided for conveying focussed radiation from the focal plane 90 to remotely disposed detector(s) 58. A frame 92 supports the lens elements.

Having thus discussed two presently preferred embodiments of a wide angle telescope for the strapdown star tracker of the invention, other elements of the system will now be discussed in greater detail.

In further regard to the various detector arrays discussed above a CCD detector array, such as the array 58, can be regarded as performing two distinct tasks. The first task is the photosensing process whereby incident image energy is converted to charge packets and collected in the individual MOS capacitor gates. Each of the gates holds a charge representing a small portion of the entire image. The portion of total image that the charge represents defining a picture element or pixel. Thus the input image is sensed and stored as discrete pixels. The second task performed by the CCD is the transferring of charge out of the device. This includes a conversion of the charge to voltage via an associated output amplifier.

Furthermore, a star tracker as described herein requires that the spectral responsivity of the sensor match the spectral emission band of available star energy. The detector 58 and more specifically the detector material must be capable of detecting star energy at the wavelengths at which it is emitted. Atmospheric transmittance and optical attenuation must also be considered when selecting a detector material.

It is known that a significant portion of the star energy is contained in the 0.1 to 5.0 micron band. However, it is also known that star tracker system optics, including the vehicle window 42, lenses made of conventional optical materials, and the associated detector 58 faceplate, serve to attenuate star energy at wavelengths below approximately 0.3 micron. The atmosphere also attenuates star energy through scattering and absorption. The cumulative effect of these various energy losses causes the available star energy to lie in approximate bands from 0.3 to 1.3, 1.5 to 1.8, 2.0 to 2.5 and 3.0 to 4.2 microns. With many stars having peak energy near 0.7 micron, the band from 0.3 to 1.3 microns spectrum is one desirable range of wavelengths for star tracker detector 58 operation. Silicon is one presently known detector material that operates within this region. However, it should be noted that there are a number of stars that are known to emit significant radiation with the Infrared (IR) band out to approximately 10 microns. One advantage to operating within the IR band for stellar sources is that the effect of background glare is reduced. Of course, known types of detector materials such as Group II-VI and other efficient absorbers of IR radiation need be employed when sensing IR radiation. The telescope can easily be optimized to operate in the IR region.

A second factor in the ability of the detector 58 to image stellar energy is the detector's quantum efficiency (QE). The QE is a measure of the detector's ability to convert incident radiation into signal charge. The QE varies with wavelength and yields a smaller, optimal band of energies over which the detector will function. Fortunately, silicon detectors have QEs peaking in the 0.7 micron range that coincides with a significant portion of available star energy. The QE parameter, in a strapdown star tracker, is an important consideration. A star tracker operating in a bright daytime sky environment is background noise limited. Modeled simply, the signal-to-noise ratio can be expressed as the ratio of signal photon flux over the square root of the background photon flux. Both the signal and background photons are multiplied by the QE of the detector so that the QE determines, in part, the integration time necessary to collect the required charge.

Sky background brightness data, together with photon flux data for stars of various magnitudes can be employed to calculate a signal-to-noise ratio for the detector 58 as a function of integration time. A simple expression for the signal-to-noise ratio in the background limited case is given by:

$$S/N = \frac{\phi_s t \sqrt{\eta}}{\sqrt{\phi_b t}}$$

where $\phi_s$ = signal photon flux (photons·sec$^{-1}$);
$\phi_b$ = background photon flux (photons·sec$^{-1}$);
$\eta$ = quantum efficiency; and
t = integration time In regard to the data processing functions discussed above it is shown below that for a star tracker using a focal plane array detector 58 that certain of the data processing functions are invariant across all systems designs and configurations, regardless of detector 58 motion during star tracking. Other functions, related to the added complexity of compensating for detector motion, are also discussed in detail hereinafter.

Discussing now the invariant data processing functions it can be shown that the star tracker performs four tasks. The star tracker computes an estimated star location, acquires a star, determines the sensed location and computes an angular error from the expected positions.

The expected star location is calculated based on a star list, the time, current position and aircraft attitude. Given these, the approximate location of a star image on the detector 58 array is known. Once the integration time is set, the detector 58 is read in an area surrounding the expected image location. Several frames of data may need to be collected before a sufficient signal-to-noise ratio is achieved. For short integration times, frame averaging is also necessary to remove the effects of star image scintillation.

Next, the star image must be extracted from the frame of data. The star image is typically distributed across a plurality of detector 58 pixels. A sky background bias, sky background gradient, sky background photon noise and other noises are additively present also. Successful removal of the background biases allow a thresholding of the frame with the threshold set at the additive noise ceiling. After thresholding, pixels containing signals are compared to all of their nearest neighbors and clusters of pixels containing signals are separated. The signal in each of the pixels is summed and the sums for the various clusters compared to the expected sum for the star as stored in the star catalog. A favorable comparison indicates star detection. The process is repeated if the desired star is not detected. Initial acquisition of a star after restarting the star tracker, due to malfunction or simply poor estimate of star position, may require that the above process be repeated several times in a search pattern.

Position determination of the star on the detector 58 array requires computing the centroid of the distribution of star energy. The centroid is used as the star position and its position on the array is calculated relative to a coordinate system defined by the array. The angular distance between this position and the expected star position is then provided to the control device 62 for updating position and tilt estimates of the navigation unit, 66.

Image motion levels vary from vehicle to vehicle. If known types of shock isolators are provided the range of motion environments that must be tolerated can be reduced. At frequencies below the natural frequency of the shock mounts, the vehicle motion is not attenuated. Under these conditions the star image will move across the detector 58 pixels at approximately the vehicle's angular rate. Above the natural frequency, the stellar inertial system's shock isolators attenuate vehicle vibration sharply, thereby eliminating a requirement for extremely high rate image motion compensation.

Figure 6:
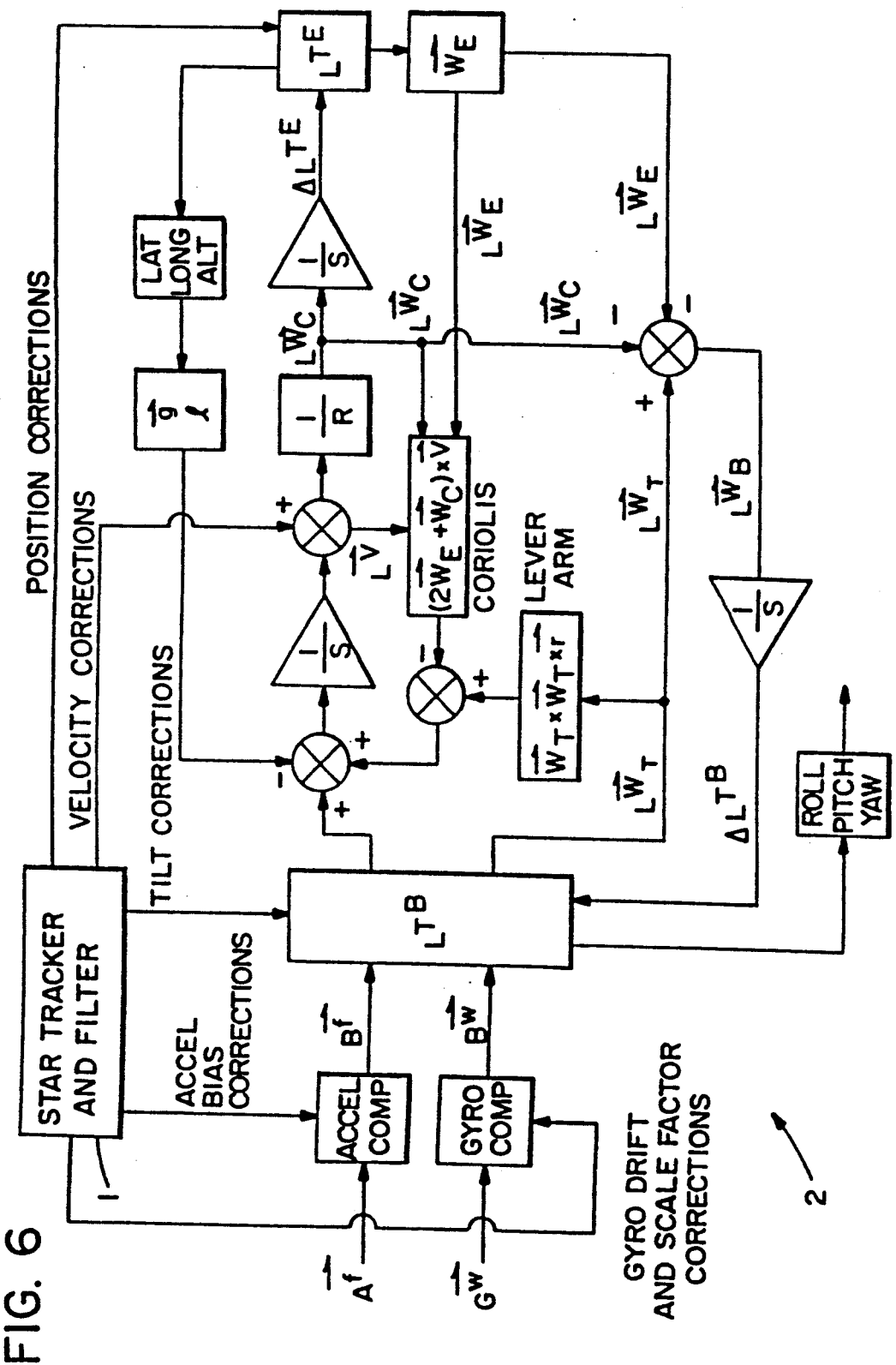
FIG. 6 is a block diagram showing a star tracker and filter coupled to an IMU.

The strapdown inertial sensor assembly 2 and the star tracker 1 of FIG. 6 may both be mounted to a common rigid bedplate, not shown, that provides a known relative attitude between the star tracker optical system and the inertial instrument cluster. This integrated system may also be isolated from small amplitude, low to moderate frequency vehicle oscillations by an active suspension system. The instrument cluster gyros sense the angular displacement of the stellar/inertial sensor assembly and provide a feedback signal to the active mount. The mount itself can be mechanized in many ways. An example would be a set of piezo-electric bimorphs or magneto-strictive elements that expand or contract as a function of an applied voltage or magnetic field. These solid-state dynamic mount drivers need be active for only a short time during image processing. Such an active mount mechanization provides for a relatively simple processing of the star image because the image is held fixed on the detector focal plane for the duration of the imaging array exposure time. However, the drivers and servos for the solid-state active mounts add complexity and weight to the system.

A variation of this solid-state motion isolation embodiment shifts the accumulating photoelectric charge in response to sensed angular rotation increments from the gyro cluster. The gyro signal is employed to provide a charge shift command to the imaging array to cause the accumulating charge to remain under the star image as the star image moves. In this manner the star signal is integrated over an interval of time sufficient to form a detectable image. This embodiment has the advantage of requiring no physical motion for motion compensation, but requires a custom imaging array that is capable of dynamic charge shifting in two dimensions. Two relatively complex array shift controllers would also be required. Like the solid-state isolation scheme, the star image processing task is relatively simple. At some point during the integration interval the absolute inertial attitude of the stellar/inertial sensor assembly is recorded and referenced to the image array. In this manner the final star image location is correlated to an expected location, and an error computed to correct the inertial system.

A presently preferred embodiment samples the imaging arrays in a rapid manner, thereby effectively "freezing" the vehicle motion. Inertial attitude data interpolated to the instant of exposure provides data on the pointing attitude of the detector array. Multiple exposures are aligned by the computer and integrated to form a single image that is free of motion-induced blur.

This preferred embodiment requires that updates to the motion compensation data be provided at a rate several times the highest frequency of oscillation that is expected to be passed by the system shock isolators. In addition, a common time reference for array sample data and inertial motion compensation data is provided. The data processing for this preferred motion compensation embodiment is more complicated than for the other embodiments but has the advantage of increasing the dynamic range of the star detection process beyond the actual photodetector capabilities. This allows for long integration times which permits the tracking of dimmer stars in brighter sky backgrounds.

The previously provided discussion of data processing for no image motion sets forth basic steps involved in processing star image data to extract useful navigation information. The added strapdown star tracker requirements of imaging very dim stars in the presence of vehicle motion increases the computational load on both hardware and software.

It has been shown that the detector array 58 necessary for obtaining adequate image resolution is relatively large and requires a substantial amount of time to read out for each frame integrated. However, a significant amount of data processing is eliminated, saving considerable time, if the number of pixels read for a particular frame is reduced. For example, known types of detector arrays have separate horizontal and vertical clocking signals that are independently varied thereby enabling a small rectangular portion of the array to be read out with the remaining charge being discarded.

Figure 7B:
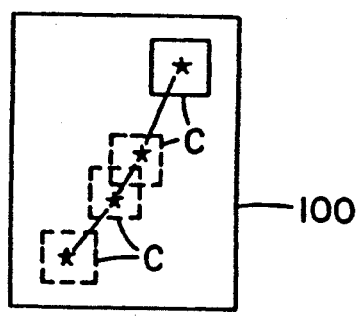
FIGS. 7a and 7b illustrate the sizing of and the tracking with a rectangular subset of CCD array pixels.
Figure 7A:
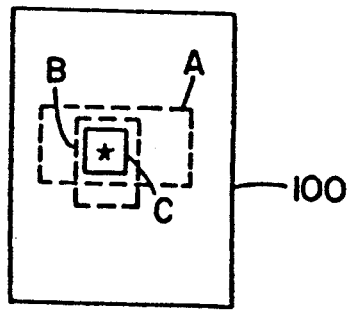

A method of tracking a star using such a programmable small rectangle readout technique is shown in FIGS. 7a and 7b and is now described. Acquisition begins with selection of rectangle size. Both the size and position of the rectangle are varied using a programmable clocking pattern generator as shown in FIG. 7a. The rectangle size is set according to the estimated uncertainty in star image location on the detector array 100. Prior to initial star acquisition the rectangle size is quite large (A). After star acquisition, the image location becomes known and the readout rectangle size is reduced (B,C). Star tracking, shown in FIG. 7b, requires that the read rectangle (C) follow the star image as it moves on the array 100. The star location on the array is known from vehicle attitude and attitude rate information. Size determination also accounts for integration time variations and required processing time for various sized rectangles.

One aspect of the strapdown star tracker of the invention is the summation of multiple image frames in order to achieve the necessary signal-to-noise ratio for detection. Summation in the presence of vehicle motion is accomplished by monitoring vehicle attitude, and hence detector motion, relative to the sky reference frame. Detector output is stored for repeated, yet translated, image frames in a single location whose coordinates lie in a frame fixed relative to that of the sky. That is, the motion is compensated for, and the separate image frames are summed and stored together even though they are physically imaged at different places on the detector. The read rectangle (C) is fixed to the sky reference frame by means of varying its position on the detector 100. To search for a star at initial acquisition time, the whole search pattern is made to move with the star and remain fixed to the sky reference frame.

Tracking a star with the above technique allows short integration times to be utilized. Short integration times advantageously prevent the detector 100 from saturating in the bright daylight sky and also allow sampling of the star image at a frequency much less than vehicle rates such that image motion is small during integration. Such short integration times, however, coupled with image smear due to image motion, allow only a small amount of star signal to gather on any pixel since photons are emitted at a fixed average rate.

Such small signal levels present a problem for conventional methods of reading charge from a CCD detector. Typically, the charge is clocked off of the detector as a voltage, amplified and converted to discrete digital values using an A/D converter. For signal levels less than an A/D converter quantum, however, the signal cannot be digitized.

One solution to this problem is achieved by employing an A/D converter having a higher resolution. By example, a 16-bit A/D converter when coupled with a CCD having a 70,000-electron pixel capacity. By this technique all signal processing is accomplished digitally and additional analog noise source are not a concern.

Alternatively, signal summation may be accomplished partly in the charge domain until enough signal is accumulated to digitize to the desired resolution. A CCD analog memory is employed to store repeated frames. Sky background saturation limits are avoided by encoding only the first difference of the serial data thereby subtracting unwanted biases but passing high spatial frequencies such as star images. Again, flexible clocking allows an image to be stored anywhere in the CCD memory just as it allows an image to be taken anywhere on the CCD.

Figure 8:
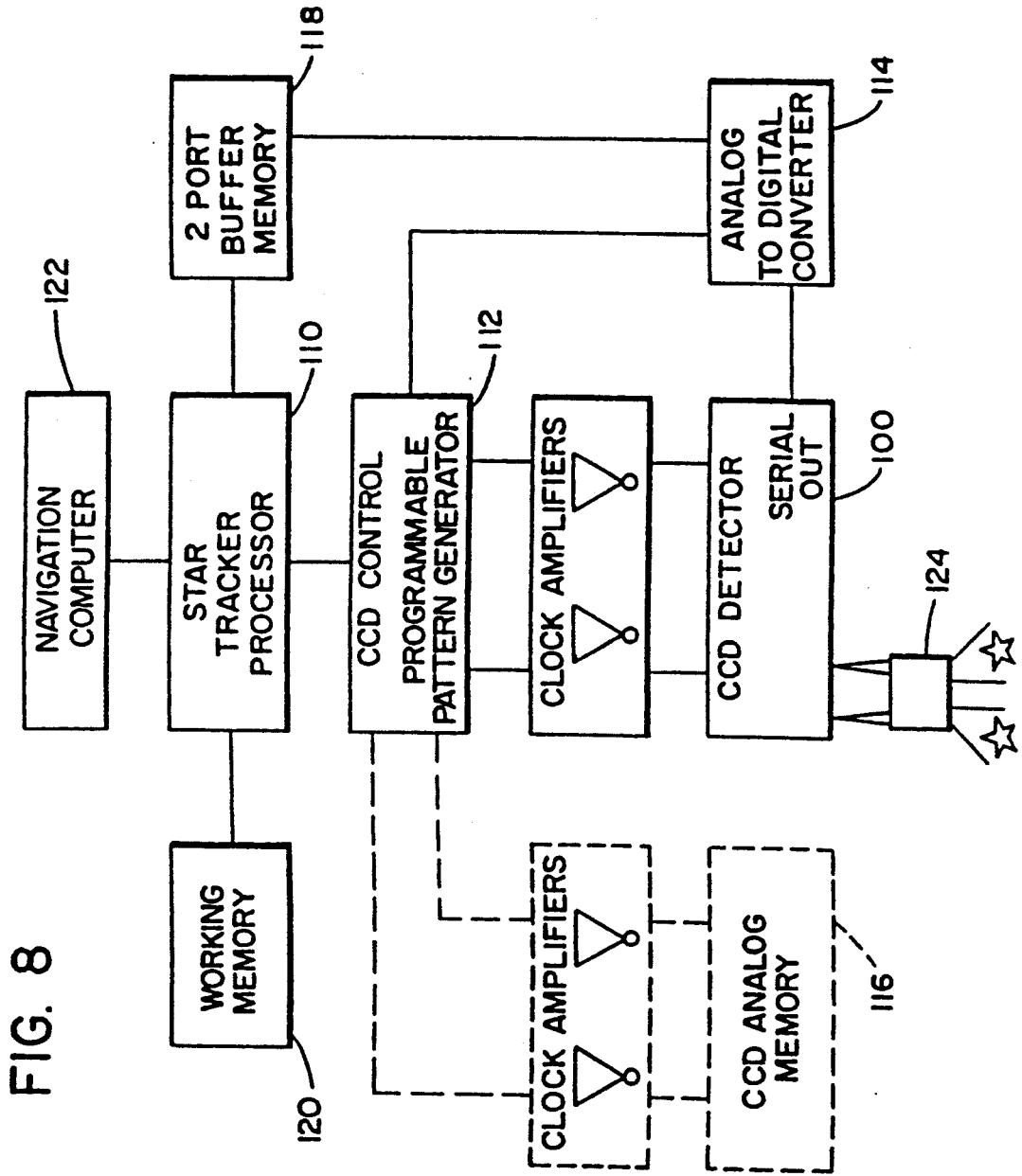
FIG. 8 is a block diagram showing a presently preferred embodiment of a strapdown star tracker including a star tracker processor and associated devices.

In an embodiment of the wide FOV strapdown star tracker, shown in FIG. 8, a star tracker processor 110 controls the read rectangle size and position by issuing commands to CCD control logic 112. The control logic 112 includes a programmable pattern generator used to produce the clocking sequence for the CCD detector. Logic is also included for control of an A/D converter 114 and CCD analog memory 116, if included. A two-port buffer memory 118 stores star image data until it is read by the star tracker processor 110. The buffer memory 118 has a sufficient number of storage locations to hold the data contained in the largest size variable read rectangle. All search, tracking, detection, and other data processing software resides in the tracker processor working memory 120. The working memory 120 also accommodates multiple image storage for digital frame integration. The navigation computer 122 supplies vehicle rate, time and star catalog data to the star tracker software executing in the star tracker processor 110. An angular error in star position is passed to the navigation computer 122 as an aid in calibrating the associated IMU. Of course, the CCD detector receives star radiation input through either of the wide angle telescope embodiments disclosed above. Specifically, a telescope 124 is constructed in accordance with the holographic lens embodiment of FIGS. 3, 4a or 4b or with the monocentric ball lens embodiment of FIGS. 5a and 5b.

Having thus described several embodiments of the invention, further embodiments are now described.

It is known that a holographic optical element (HOE) bends red light through a larger angle than blue light (while conventional lenses have an opposite effect). In this regard, FIG. 9a illustrates a single positive holographic element (HOE) 130 of focal length (f) having a chromatic aberration that causes red light to be focussed at a different point than blue light, while FIG. 9b illustrates a negative HOE 132 also having a chromatic aberration that causes red light to be focussed at a different point than blue light. As employed herein, a positive optical element is one that causes an incident wavefront to converge, while a negative optical element is one that causes an incident wavefront to diverge.

In the case of FIGS. 9a and 9b an image spread occurs, also referred to as a chromatic blur. In that the focal length is negative for the negative HOE 132, the order of the focal points for the long (red) and the short (blue) wavelengths is reversed. Thus, a combination of the HOEs of FIGS. 9a and 9b may be employed to cancel the chromatic aberration. However, if the positive and negative HOEs are placed in intimate contact, the focussing effect would also be cancelled. If the two HOEs are instead provided with some axial separation therebetween, it is also possible to achromatize the final image, but the final image becomes a virtual image.

However, and in accordance with the embodiment of the invention depicted in FIG. 10a, by the use of another achromatic optical system the virtual image may be relayed to form a real image.

In order to describe this embodiment of the invention there is first obtained an expression for the axial (longitudinal) image shift for a negative HOE used with finite conjugates. This situation is shown in FIG. 9c. A converging spherical wave enters the negative HOE and is diffracted to an on-axis point. The notation for this diagram is as follows:

e = distance from HOE to which the incident spherical wavefront is directed (object distance);

e' = distance to which the spherical wavefront is diffracted (image distance);

$\Delta e'$ = the axial (longitudinal) shift of e' for bandwidth $\Delta\lambda$; and f = focal length of the HOE.

It can be shown that $$1/e' = 1/e + 1/f \quad (1)$$

and that the longitudinal shift ' is given by $$ae' = -\Delta e/\lambda \times e'^2/f. \quad (b\ 2)$$

FIGS. 9a and 9c are combined into FIG. 9d in such a manner that the focus of FIG. 9a coincides with that of the longer conjugate region of FIG. 9d. This is accomplished by reversing FIG. 9c. If the magnitudes of the longitudinal shifts of the two HOE's are made equal, the emerging spherical wavefront is achromatic. An achromatic field lens 140 is employed to image the positive HOE 134 on to the negative HOE 136 so that rays diffracting from the same point on the positive HOE 134 also diffract from the same point on the negative HOE 136. A condition that provides an achromatic virtual image with the shorter conjugate from the negative HOE 136 is given by:

$$-f_1 f_2 = e'^2, \quad (3)$$

where $f_1$ and $f_2$ refer to the focal lengths of positive HOE 134 and to the negative HOE 136, respectively.

Figure 9E:
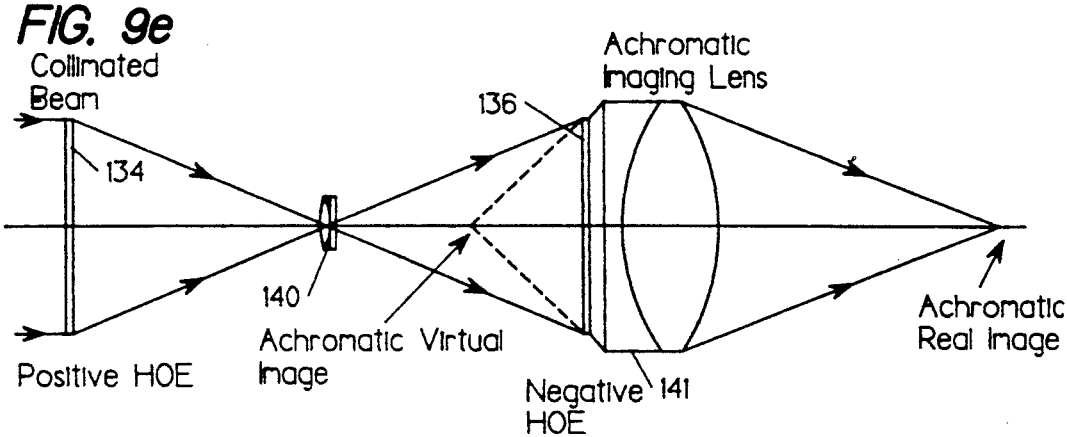
FIG. 9e illustrates an embodiment of the invention wherein the negative HOE of FIG. 9d has an achromatic imaging lens disposed adjacent to a second surface thereof for providing an achromatic real image.

A second achromatic optical system may be used after the negative HOE 136 to relay the virtual achromatic image into a real achromatic image. This is shown in FIG. 9e wherein the two HOE's 134 and 136 and the achromatic field lens 140 are combined with an achromatic relay lens 141 to form a final real image that is free from chromatic aberration (both longitudinal and lateral). The embodiment shown in FIG. 9e employs a transmission HOE for both the positive and the negative HOEs 34 and 136.

Figure 9F:
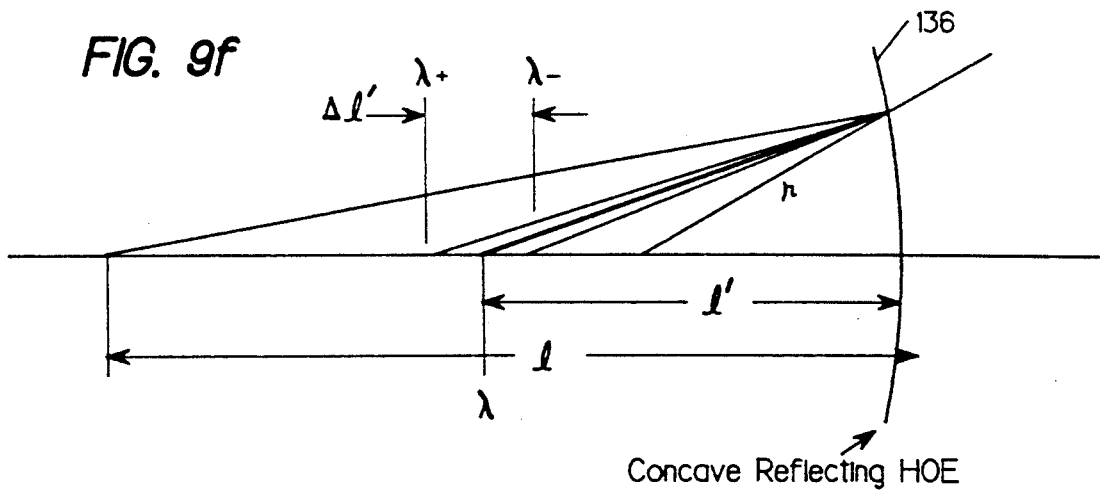
FIG. 9f illustrates optical properties of a concave reflecting HOE having a radius (r)

However, the negative HOE 136 may also be embodied as a reflection element. In that a reflecting element is achromatic, the second achromatic lens 141 may be replaced by a concave mirror. As a further embodiment, the reflecting HOE 136 is superposed on the concave mirror to obtain an achromatic real image. FIG. 9f schematically depicts the operation of such a concave reflection HOE and shows that it exhibits an opposite chromatic aberration to the embodiment shown in FIG. 9b. The relationships are similar to those previously described, with the addition of a new parameter, the radius of curvature r of the concave HOE 136. The axial chromatic aberration is given by:

$$\Delta e' = e'^2 \times \Delta\lambda/\lambda(2/r\ a - 1/f). \quad (4)$$

The relationship between e and e' is similar to Equation (1) and it is given by:

$$1/e' + 1/e = 1/f. \quad (5)$$

Figure 9G:
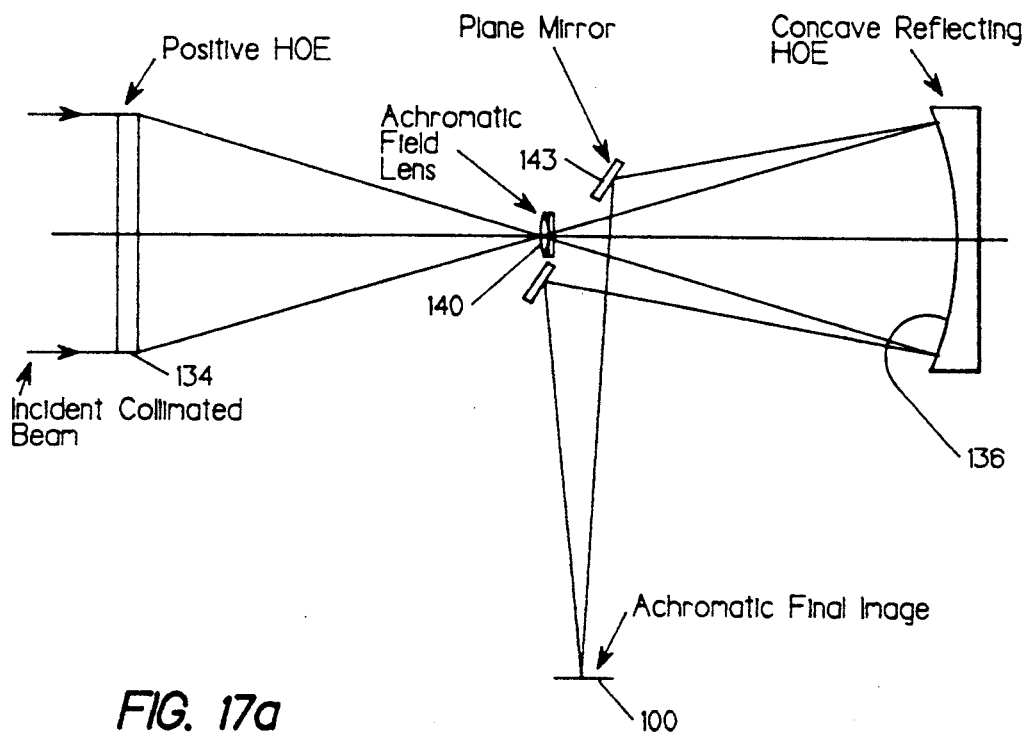
FIG. 9g illustrates an on-axis centrally symmetric embodiment of the invention that includes a plane mirror tilted at an angle to an axis passing through a positive HOE and a concave reflecting HOE.

FIG. 9g illustrates an embodiment of the invention that combines the positive HOE 134 and the concave reflective negative HOE 136 to form an achromatic real image. In order to avoid the folding back of the optics on itself, a reflecting plane mirror 143 is positioned near the achromatic field lens 140 in a tilted relationship to the optical axis so as to relay the real image to an off-axis image plane, typically the detector 100.

The above set forth relationships are for on-axis, centrally symmetric HOE's. However, these relationships may be extended to obtain tilted systems.

One such non-centrally symmetric tilted system is shown in FIG. 10a and illustrates a further embodiment of the telescope 124 of FIG. 8. This embodiment provides for minimizing a focal spot size upon the detector 100 and eliminates a requirement for the plane mirror 143 of FIG. 9g. A first optical element is the positive transmissive HOE 134 positioned for directing radiation to a second optical element embodied in the negative reflection HOE 136 that is disposed upon a concave substrate 138. The negative HOE 136 reflects, to a single focal point on the detector 100, chromatically corrected light rays. To further improve efficiency and color correction, the small field lens 140 is preferably disposed near the focal point (FP) of the positive HOE 134. As was previously stated, lens 140 operates to bring light rays diverging from a single point on the primary HOE 134 to a single point on the negative (secondary) HOE 136 so that a same amount of chromatic correction is added to each ray.

Figure 11A:
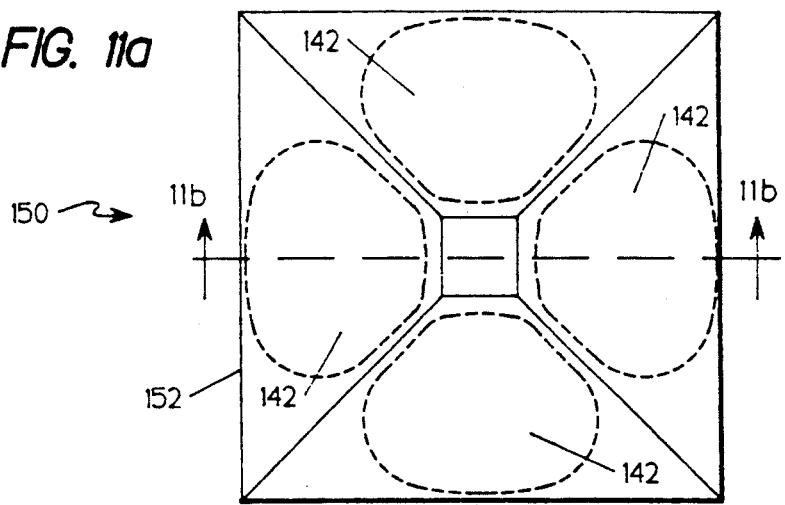
FIG. 11a is a top view.
Figure 11B:
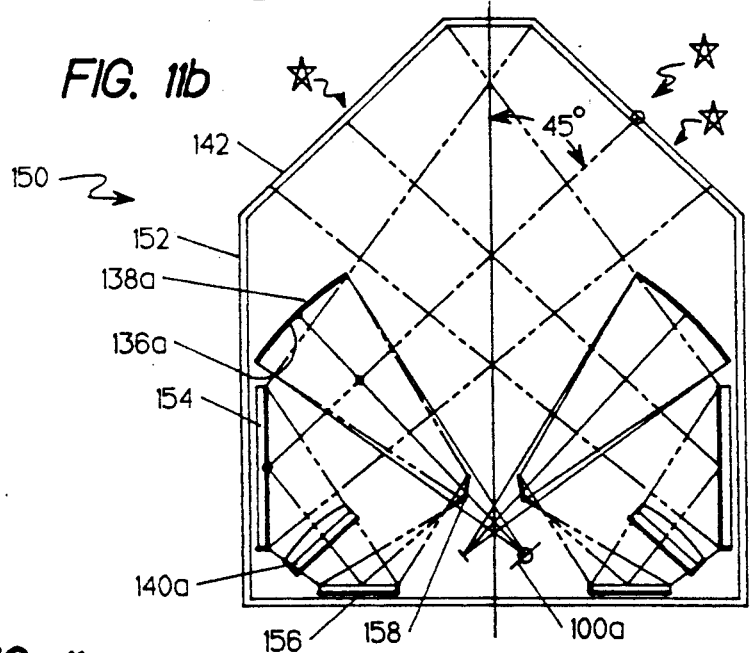
FIG. 11b is a cross-sectional view, taken along the section line b—b of FIG. 11a, and FIG. 11c is an elevational view showing four of the holographic telescopes of FIG. 10b packaged together into a compact, multiple FOV telescope.
Figure 11C:
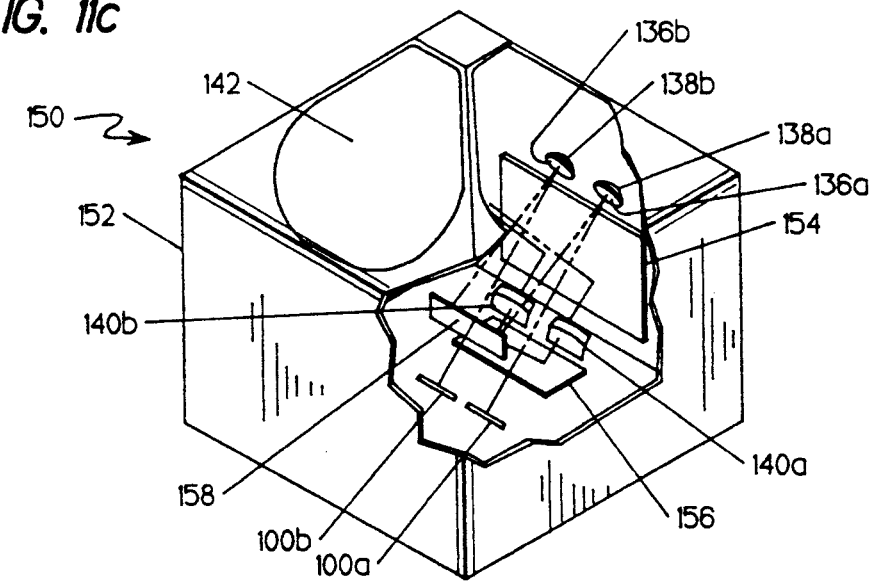

To further increase the FOV two converging lens are multiplexed into the positive HOE 134, yielding the embodiment of FIG. 10b. In FIG. 10b a two lens positive HOE 142 is provided having the FOVs of each of the two HOE lenses offset by 10°, as shown. Two negative HOE aberration correctors 136a and 136b, each disposed upon a concave substrate 138a and 138b, respectively, reflect chromatically corrected light rays to a focal point on associated detectors 100a and 100b, respectively. Each of these optical channels is provided with a field lens 140a and 140b positioned near FP1 and FP2, respectively. FIG. 11a is a top view, FIG. 11b is a cross-sectional view, taken along the section line b—b of FIG. 11a, and FIG. 11c is an elevational view showing four of the corrected HOE optical channels of FIG. 11 packaged together into a compact, multiple FOV telescope 150. An enclosure 152 includes the aforedescribed components and further includes beam folding mirrors 154, 156, and 158, one set for two optical channels, to achieve the desired compact package size. By example, in the telescope 150 each FOV is 3°×3°, yielding a total FOV of 72 square degrees. The telescope 150 is strapped down during use and enables the simultaneous imaging of a plurality of stellar objects and other heavenly bodies so as to obtain navigation-related information in a manner described in detail above.

It should be realized that the telescope 150 may be employed in systems other than navigation systems, and may also be employed in a stand-alone manner to provide a chromatically corrected, single or multiple-FOV optical element.

It should also be realized that it is within the scope of the invention to record more than two converging lenses into each of the positive HOEs 142 and to provide additional sets of concave negative HOEs 136 and field optics 140. By example, the holographic medium may be a dichromated gelatin layer having a total thickness of approximately 20 micrometers. The medium contains three exposures of a master hologram, with each exposure being displaced 120° one from another. It is also within the scope of the invention to provide a telescope 150 having more or less than the four entrance apertures depicted in FIGS. 11a–11c, with each entrance aperture comprising a positive HOE having one or more converging lenses recorded within.

Figure 12:
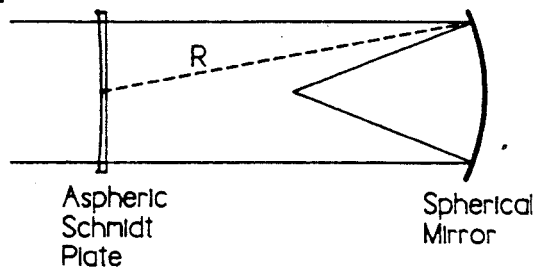
FIG. 12 shows a Schmidt telescope of the prior art.

FIG. 12 shows a conventional Schmidt telescope that includes a concave spherical mirror and an aspheric corrector plate. The corrector plate is positioned at the center of curvature (R) of the mirror and corrects for the spherical aberration of the mirror. The corrector plate is also the stop of the system. In that all chief rays (those that go through the center of the stop) are normal to the spherical mirror, the Schmidt telescope has no astigmatism or coma. This makes possible both a large instantaneous field of view and high light-gathering power. However, the aspheric corrector plate is difficult and costly to fabricate and test. Also, the corrector plate does not work well for very large off-axis angles.

Figure 13A:
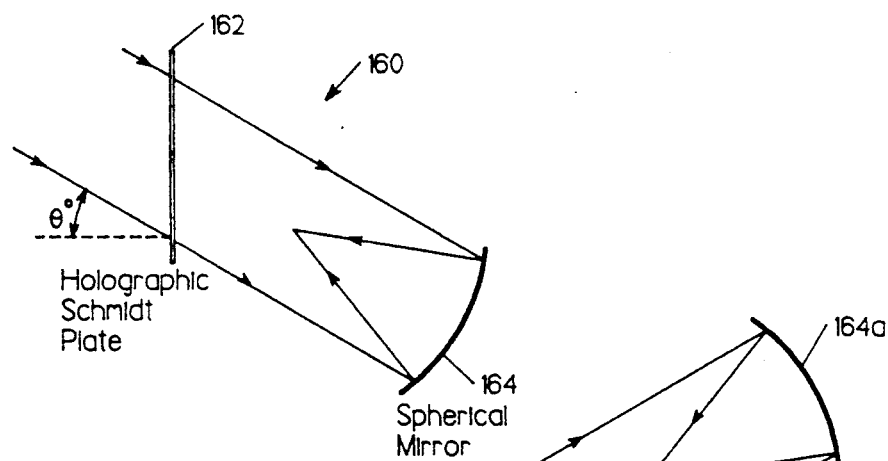
FIG. 13a shows a single off-axis holographic Schmidt telescope.

FIG. 13a illustrates, in accordance with a further aspect of the invention, a single off-axis holographic Schmidt telescope 160 that includes a HOE corrector plate 162 and a spherical mirror 164. The illustrated embodiment has an incidence angle of theta. The holographic corrector plate 162 may be constructed for much larger off-axis angles than the conventional Schmidt corrector plate of FIG. 12. A large off-axis angle is desirable because it facilitates multiplexing several Schmidt corrector plates into one hologram. That is, one hologram may contain two or more separate Schmidt corrector plates, each working in a different direction.

Figure 13B:
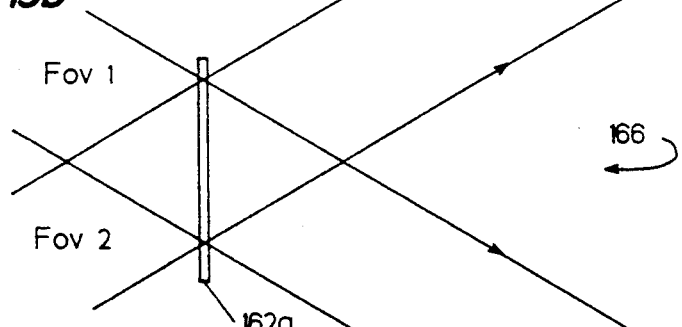
FIG. 13b shows a multiplexed, wide-field Schmidt telescope.

This configuration is shown in FIG. 13b for a Schmidt telescope 166 having a multiplexed HOE corrector 162a and two spherical mirrors 164a and 164b. In this configuration, objects, such as stars, may be imaged simultaneously from two directions.

Figure 14A:
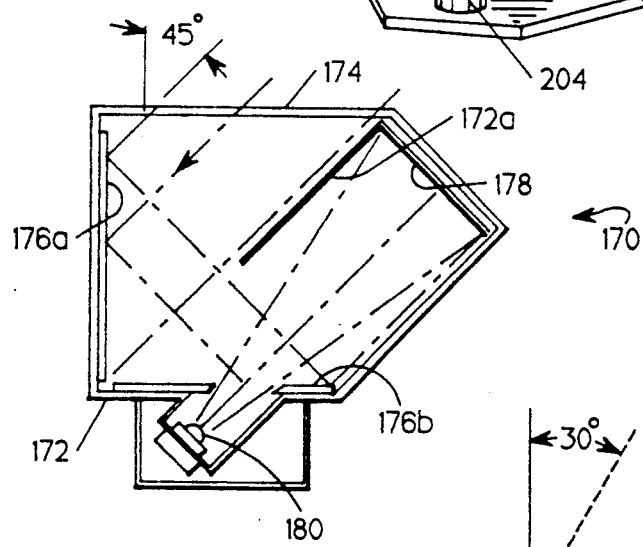
FIG. 14a and FIG. 14b each depict an embodiment of a holographic Schmidt telescope that includes fold mirrors.
Figure 14B:
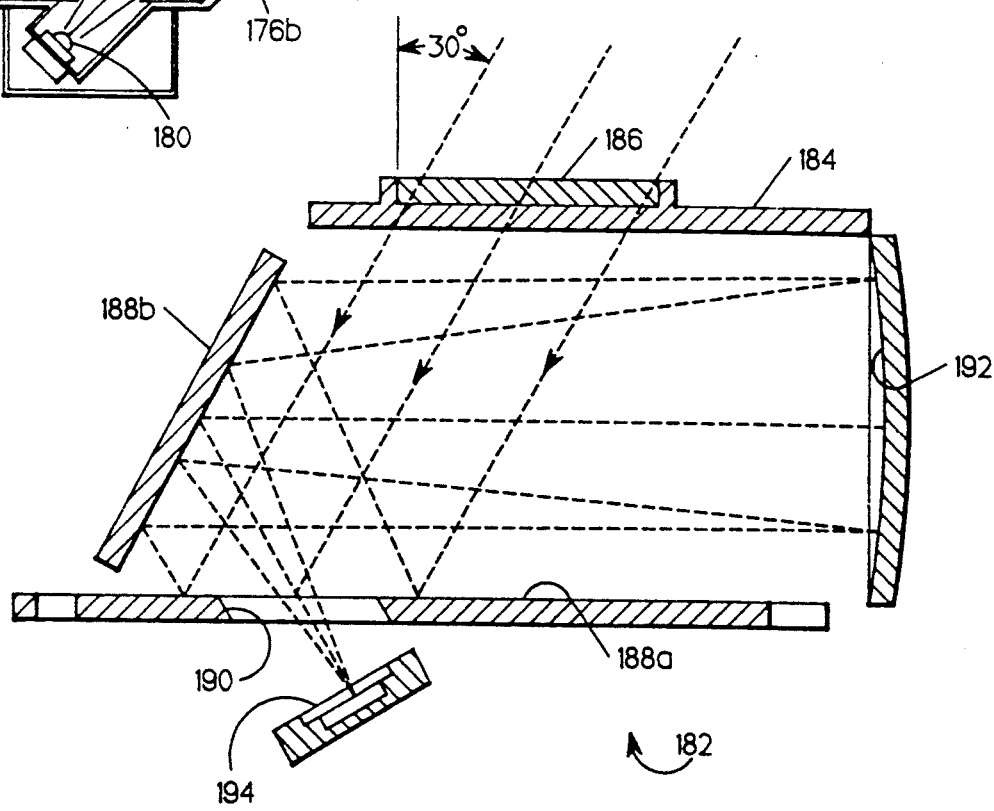

As seen in FIGS. 14a and 14b the components of such a holographic Schmidt telescope may be packaged in a small volume through the use of fold mirrors. Fold mirrors may be employed in a number of different configurations, depending on the number of telescopes and the direction of the incident light.

In FIG. 14a a Schmidt telescope 170 includes a housing 172 and a holographic Schmidt corrector plate 174. The corrector plate 174 has an incidence angle of 45°. Radiation passes through the corrector plate 174, is corrected thereby for aberration of a spherical mirror 178, and impinges on a first fold mirror 176a. Disposed at a 90° angle to fold mirror 176a is a second fold mirror 176b that is positioned for directing radiation to the spherical mirror 178. Spherical mirror 178 focuses the corrected radiation, through an aperture in the fold mirror 176b, onto a detector 180. A sunshade, or baffle 172a, may be included to shield the detector 180 from sunlight.

In FIG. 14b a Schmidt telescope 182 includes a housing 184 and a holographic Schmidt corrector plate 186. In this embodiment the corrector plate 186 has an incidence angle of 30°. Radiation passes through the corrector plate 186 and impinges on a first fold mirror 188a. Disposed at a 60° angle to fold mirror 188a is a second fold mirror 188b which is positioned for directing radiation to a spherical mirror 192. Radiation, corrected by the corrector plate 186, reflects from the spherical mirror 192 to fold mirror 188b, and from fold mirror 188b is directed through an aperture 190 within fold mirror 188a and is focussed upon a detector 194.

Figure 15:
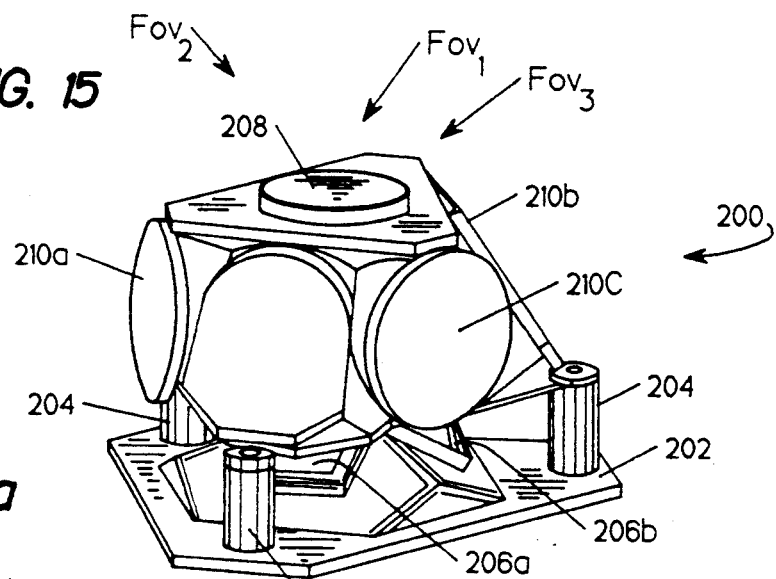
FIG. 15 shows a wide-field holographic telescope having three holographic Schmidt telescopes, each operating at a same angle of incidence.

Referring to FIG. 15 there is shown an optical system 200 that includes three holographic Schmidt telescopes, each telescope operating at a 30° angle of incidence. Optical system 200 includes a focal plane array base 202 and supports 204. Mounted on the focal plane array base 202 are three focal plane array detector packages. Only focal plane array detector packages 206a and 206b are shown in FIG. 15. Supports 204 support an assembly that includes a holographic Schmidt correct plate 208 having three fields of view, each with an incidence angle of 30°. Each of the spherical mirrors 210a–210c is disposed relative to the corrector plate 208 for receiving radiation from one of the field of views (FOV$_1$–FOV$_3$) and for focussing the corrected radiation onto one of the focal plane array packages 206.

In FIG. 15, the single HOE corrector plate 208 functions as three independent Schmidt correctors and serves as both the front element and stop of the optical system 200.

Although chromatic aberration may present a problem in HOEs, in that the diffraction angle varies with wavelength, the holographic Schmidt telescope embodiments described above are not adversely affected by chromatic effects. This is because the diffraction angles are generally small and thus do not vary significantly with wavelength.

Figure 16:
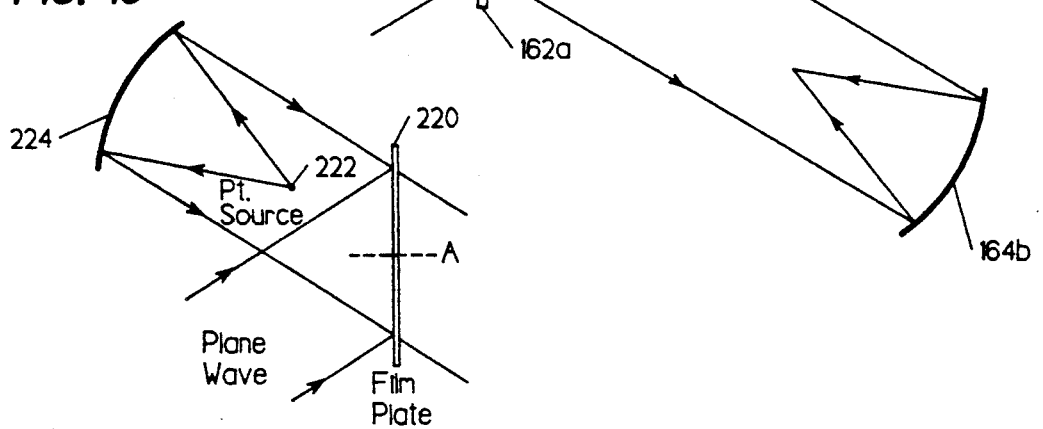
FIG. 16 illustrates a method for HOE construction.

FIG. 16 illustrates a method for producing the HOE corrector plate. Generally, a film plate 220 that includes a holographic medium, by example dichromated gelatin, is disposed for receiving a plane wave at an angle equal to a desired incidence angle. Film plate 220 also receives aberrated radiation from a point source 222 that reflects from a spherical mirror 224. Spherical mirror 224 has a radius of curvature that is preferably equal to a radius of curvature that the HOE corrector plate will be used with when integrated into an optical system, as in FIG. 15. The result of exposing the film plate 220 is to record within the holographic medium of the film plate 220 an interference pattern of the plane wavefront and a wavefront having a spherical aberration resulting from the spherical mirror 224. To record a second corrector plate within the film plate 220, the film plate 220 is rotated about an axis A, and the process is repeated. By example, to record three spherical aberration correction patterns, the film plate 220 can be rotated by 120° between exposures.

Figure 17A:
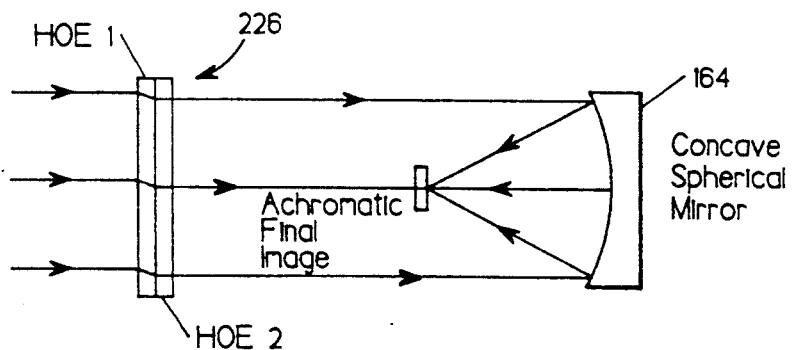
FIG. 17a shows a HOE assembly used to provide an achromatic final image with a concave spherical mirror.
Figure 17B:
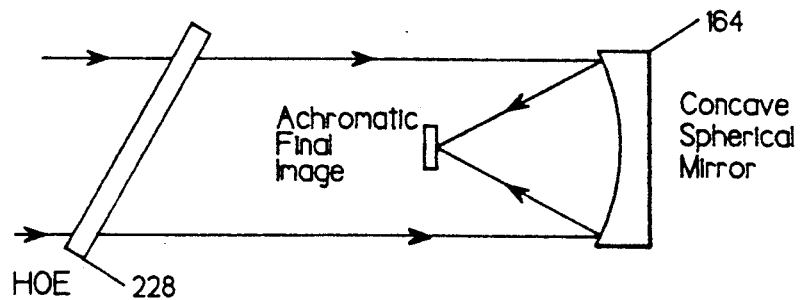
FIG. 17b shows an off-axis HOE assembly used to provide an achromatic final image with a concave spherical mirror.

The aberrated wavefront can be produced using a mirror, as in FIG. 16, or with a lens. The diffraction efficiency of the HOE may be enhanced by using two HOEs joined together in series to form a HOE assembly 226, as shown in FIG. 17a. An off-axis HOE 228 is shown in FIG. 17b. Both of these embodiments provide an achromatic final image.

While the invention has been particularly shown and described with respect to preferred embodiments thereof, it will be understood by those skilled in the art that changes in form and details may be made therein without departing from the scope and spirit of the invention.

What is claimed is:

1. A multiple field of view optical telescope, comprising:
    a primary holographic optical element (HOE) having a first surface for receiving a plurality (N) of ray bundles representing a plurality (N) of wavefronts and a second surface for outputting the plurality of ray bundles to a plurality (N) of focal points, the primary HOE having a first aberration characteristic for wavelengths within a band of wavelengths;

a plurality (N) of secondary HOEs individual ones of which have a concave reflecting surface of radius (r) for directing an incident ray bundle received from said primary HOE so as to form a final real image at an associated one of (N) focal points, each of said concave reflecting surfaces being disposed along an axis that runs from said second surface of said primary HOE and that passes through an associated one of said N focal points, each of said plurality of secondary HOEs having a second aberration characteristic for wavelengths within the band of wavelengths that is opposite that of the first aberration characteristic for substantially cancelling an effect of the first aberration characteristic upon the associated one of the final real images; and a plurality (N) of achromatic lens elements individual ones of which are disposed in proximity to one of said (N) focal points for imaging the primary HOE upon an associated one of the secondary HOEs such that all rays diverging from a single point on the second surface of the primary HOE are brought to a single point on the surface of the secondary HOE.

2. A multiple field of view optical telescope as set forth in claim 1 wherein, for each of the secondary HOEs:

e = a distance to which the wavefront is directed (object distance);
e' = distance to which the wavefront is diffracted (image distance);
$\Delta e'$ = an axial (longitudinal) shift of e' for bandwidth $\Delta \lambda$, where $\lambda$ is a nominal wavelength;
f = focal length of the second HOE; and wherein the axial chromatic aberration of each of the second HOEs is given by:

$$\Delta e' = e'^2 (\Delta \lambda / \lambda)(2/r - 1/f)).$$

3. A multiple field of view optical telescope as set forth in claim 1 and further comprising a plurality (N) of radiation detector means each of which has a radiation sensitive surface disposed at one of said N focal points.

4. A multiple field of view telescope as set forth in claim 3 wherein said telescope is strapped down to an inertial navigation apparatus for simultaneously imaging a plurality of stellar objects, and wherein each of said radiation detector means has an output coupled to a position determining means of said inertial navigation apparatus.

5. A multiple field of view optical telescope as set forth in claim 1 and further comprising (N) sets of beam folding mirrors, wherein for each of said N sets:

one of said beam folding mirrors is disposed for folding the path between said second surface of said primary HOE and one of said achromatic lens elements; and
two of said beam folding mirrors are disposed for twice folding the path between said one of said achromatic lens elements and said concave reflecting surface of an associated one of said secondary HOEs.

6. Optical apparatus, comprising:
a primary holographic optical element (HOE) having a first surface for receiving at least one ray bundle representing a wavefront and a second surface for outputting the ray bundle to a first focal point, the primary HOE having a first aberration characteristic for wavelengths within a band of wavelengths;

a secondary HOE having a concave reflecting surface of radius (r) for directing an incident ray bundle received from said primary HOE so as to form a final real image at a second focal point, said concave reflecting surface being disposed along an axis that runs from said second surface of said primary HOE and that passes through the second focal point, said secondary HOE having a second aberration characteristic for wavelengths within the band of wavelengths that is opposite that of the first aberration characteristic for substantially cancelling an effect of the first aberration characteristic upon the final real image;

an achromatic lens element disposed in proximity to the first focal point for imaging the primary HOE upon said secondary HOE such that all rays diverging from a single point on the second surface of the primary HOE are brought to a single point on the surface of the secondary HOE; and mirror means disposed along a plane that passes through the axis at an angle thereto for reflecting the final real image to point off of the axis.

7. Optical apparatus set forth in claim 1 wherein:
e = a distance to which the wavefront is directed (object distance);
e' = distance to which the wavefront is diffracted (image distance);
$\Delta e'$ = an axial (longitudinal) shift of e' for bandwidth $\Delta \lambda$, where $\lambda$ is a nominal wavelength;
f = focal length of the second HOE; and wherein the axial chromatic aberration of each of the second HOEs is given by:

$$\Delta e' = e'^2 (\Delta \lambda / \lambda)(2/r - 1/f)).$$

8. Optical apparatus, comprising:
a primary holographic optical element (HOE) having a first surface for receiving at least one ray bundle representing a wavefront and a second surface for outputting the ray bundle to a first focal point, the primary HOE having a first aberration characteristic for wavelengths within a band of wavelengths;

a secondary HOE of negative power having a first surface for receiving an incident ray bundle from said primary HOE and a second surface for outputting the incident ray bundle therefrom, said first surface of said secondary HOE being disposed along an axis that runs from said second surface of said primary HOE and that passes through an achromatic virtual image focal point that is disposed between said primary HOE and said secondary HOE, said secondary HOE having a second aberration characteristic for wavelengths within the band of wavelengths that is opposite that of the first aberration characteristic for substantially cancelling an effect of the first aberration characteristic;

a first achromatic lens element disposed in proximity to the first focal point for imaging the primary HOE upon said secondary HOE such that all rays diverging from a single point on the second surface of the primary HOE are brought to a single point on the surface of the secondary HOE; and a second achromatic lens element disposed adjacent to said second surface of said secondary HOE for focussing the ray bundle output therefrom so as to form an achromatic real image at a second focal point.

9. A strapdown star tracker for generating navigational information from an assumed position given by an inertial measurement unit aboard a vehicle, comprising:

viewing means having one or more entrance apertures, each having one or more fields of view, for simultaneously imaging a plurality of heavenly bodies;

means for strapping down said viewing means in a fixed orientation to the vehicle;

means for converting the images of the viewed heavenly bodies into detectable electrical signals; and means, coupled to said converting means and responsive thereto, for deriving inertial measurement unit correctional information; wherein each of said one or more entrance apertures includes a primary holographic optical element (HOE) having a first surface for receiving one or more ray bundles, each representing a wavefront emanating from a heavenly body, and a second surface for outputting the one or more received ray bundles to one or more focal points, the primary HOE having a first aberration characteristic for wavelengths within a band of wavelengths; and wherein said viewing means further includes at least one secondary HOE disposed along an axis passing through one of the focal points, at least one secondary HOE having a second aberration characteristic for wavelengths within the band of wavelengths that is opposite that of the first aberration characteristic for substantially cancelling an effect of the first aberration characteristic upon an image of a heavenly body.

10. A star tracker as set forth in claim 9 wherein said viewing means includes:

a plurality (N) of the secondary HOEs individual ones of which have a concave reflecting surface of radius (r) for directing an incident ray bundle received from said primary HOE so as to form a real image at an associated one of (N) focal points, each of said concave reflecting surfaces being disposed along an axis that runs from said second surface of said primary HOE and that passes through an associated one of said N focal points, each of said plurality of secondary HOEs having a second aberration characteristic for wavelengths within the band of wavelengths that is opposite that of the first aberration characteristic for substantially cancelling an effect of the first aberration characteristic upon the associated one of the final real images; and a plurality (N) of achromatic lens elements individual ones of which are disposed in proximity to one of said (N) focal points for imaging the primary HOE upon an associated one of the secondary HOEs such that all rays diverging from a single point on the second surface of the primary HOE are brought to a single point on the surface of the secondary HOE.

11. A star tracker as set forth in claim 10 and further comprising (N) sets of beam folding mirrors, wherein for each of said N sets:

one of said beam folding mirrors is disposed for folding the path between said second surface of said primary HOE and one of said achromatic lens elements; and two of said beam folding mirrors are disposed for twice folding the path between said one of said achromatic lens elements and said concave reflecting surface of an associated one of said secondary HOEs.

12. A star tracker as set forth in claim 9 wherein said at least one secondary HOE has a concave reflecting surface of radius (r) for directing an incident ray bundle received from said primary HOE so as to form a final real image at a second focal point, said concave reflecting surface being disposed along the axis that runs from said second surface of said primary HOE and that passes through the second focal point, said secondary HOE having a second aberration characteristic for wavelengths within the band of wavelengths that is opposite that of the first aberration characteristic for substantially cancelling an effect of the first aberration characteristic upon the final real image; said viewing means further including, an achromatic lens element disposed in proximity to the first focal point for imaging the primary HOE upon said secondary HOE such that all rays diverging from a single point on the second surface of the primary HOE are brought to a single point on the surface of the secondary HOE; and mirror means disposed along a plane that passes through the axis at an angle thereto for reflecting the final real image to point off of the axis.

13. A Schmidt telescope, comprising:

a concave spherical mirror; and a corrector plate positioned at or near the center of curvature of said spherical mirror for correcting for a spherical aberration of said concave spherical mirror, said corrector plate including a holographic optical element.

14. A Schmidt telescope as set forth in claim 13 and further including a radiation detector positioned at a focal point of said concave spherical mirror.

15. A Schmidt telescope as set forth in claim 13 and further including at least one fold mirror that is positioned between said concave spherical mirror and said corrector plate.

16. A multiple field of view Schmidt telescope, comprising:

a plurality of concave spherical mirrors; and a plurality of corrector plates each of which is optically positioned at a center of curvature of one of said spherical mirrors, each of said corrector plates being included within a holographic optical element assembly, the holographic optical element assembly including one or more holographic optical elements.

17. A multiple field of view Schmidt telescope as set forth in claim 16 and further including a plurality of radiation detectors individual ones of which are positioned at a focal point of one of said concave spherical mirrors.

18. A multiple field of view Schmidt telescope as set forth in claim 16 and further including at least one fold mirror that is positioned between one of said concave spherical mirrors and one of said corrector plates.

19. An optical system comprising:

an optical stop comprising a holographic optical element having a plurality of spherical aberration corrector plates each having a different field of view;

a plurality of concave spherical reflectors individual ones of which are positioned for receiving a corrected wavefront from one of said corrector plates; and a plurality of radiation detectors individual ones of which are positioned at a focal plane of one of said concave spherical reflectors.

20. An optical system as set forth in claim 19 and further including a plurality of fold mirrors individual ones of which are positioned for relaying radiation from one of said plurality of corrector plates to one of said plurality of concave spherical reflectors.

21. An optical system as set forth in claim 19 wherein said optical system is strapped down to an inertial navigation system for simultaneously viewing a plurality of heavenly bodies.

* * * * *